US012582567B2

(12) United States Patent
Seltzer et al.

(10) Patent No.: US 12,582,567 B2
(45) Date of Patent: Mar. 24, 2026

(54) MEDICAL PROCEDURE FACILITATION SYSTEM

(71) Applicants: William Beaumont Hospital, Royal Oak, MI (US); Grand Valley State University, Allendale, MI (US)

(72) Inventors: Marlene Seltzer, Bloomfield Hills, MI (US); John Farris, Grand Rapids, MI (US); Michael R. Gruizinga, Kalamazoo, MI (US); Simon P. Warnos, Kalamazoo, MI (US); Jacob DeWind, Kalamazoo, MI (US); Robert Feeman, Kalamazoo, MI (US); Robert A. Long, Lansing, MI (US)

(73) Assignees: GRAND VALLEY STATE UNIVERSITY, Allendale, MI (US); WILLIAM BEAUMONT HOSPITAL, Royal Oak, MI (US)

( * ) Notice: Subject to any disclaimer, the term of this patent is extended or adjusted under 35 U.S.C. 154(b) by 316 days.

(21) Appl. No.: 18/473,759

(22) Filed: Sep. 25, 2023

(65) Prior Publication Data

US 2024/0009050 A1 Jan. 11, 2024

Related U.S. Application Data

(63) Continuation-in-part of application No. 17/718,240, filed on Apr. 11, 2022, now abandoned, which is a
(Continued)

(51) Int. Cl.
*A61G 7/10* (2006.01)

(52) U.S. Cl.
CPC ......... *A61G 7/1019* (2013.01); *A61G 7/1001* (2013.01); *A61G 7/1098* (2013.01)

(58) Field of Classification Search
CPC .. A61G 7/1019; A61G 7/1001; A61G 7/1098; A61G 2200/16; A61G 13/1245;
(Continued)

(56) References Cited

U.S. PATENT DOCUMENTS

| | | | | |
|---|---|---|---|---|
| 3,318,596 A * | 5/1967 | Herzog | .................. | A61G 13/00 5/619 |
| 5,157,800 A * | 10/1992 | Borders | ............. | A61G 13/0009 5/624 |

(Continued)

FOREIGN PATENT DOCUMENTS

| | | |
|---|---|---|
| AT | 396327 B | 12/1992 |
| CA | 2107212 C | 10/1992 |

(Continued)

OTHER PUBLICATIONS

U.S. Appl. No. 17/718,240, filed Apr. 11, 2022, Published.
U.S. Appl. No. 17/575,426, filed Jan. 13, 2022, Published.

*Primary Examiner* — Myles A Throop
(74) *Attorney, Agent, or Firm* — Honigman LLP; Douglas H. Siegel

(57) ABSTRACT

A medical lift-assistance device including a bracket, a variable assist mechanism, a lifting arm, and a pad sub-assembly. The variable assist mechanism has a strut attached to the bracket, a height-adjustment feature, a first gear, a first axle, a first rotational axis extending along the first axle, a first rotational direction, a second gear, a second axle, a second rotational axis extending along the second axle, and a second rotational direction. The first gear is rotatably attached to the first axle and the second gear is rotatably attached to the second axle and engages the first gear. The strut applies a force to the height-adjustment feature capable of causing the first gear to rotate in the first rotational direction and the second gear and the lifting arm to rotate in the second rotational direction.

28 Claims, 19 Drawing Sheets

Related U.S. Application Data continuation-in-part of application No. 17/575,426, filed on Jan. 13, 2022.

(60) Provisional application No. 63/142,686, filed on Jan. 28, 2021.

(58) Field of Classification Search
CPC .............. A61G 13/0009; A61G 13/125; A16G 15/105; A16G 15/12
USPC .............................................................. 5/83.1
See application file for complete search history.

(56) References Cited

U.S. PATENT DOCUMENTS

| | | | | | |
|---|---|---|---|---|---|
| 5,774,914 | A * | 7/1998 | Johnson | A61G 7/0514 5/613 |
| 5,961,085 | A * | 10/1999 | Navarro | A47C 16/00 5/624 |
| 6,196,631 | B1 * | 3/2001 | Larson | A47C 7/5066 297/423.26 |
| 6,725,479 | B1 * | 4/2004 | Stryker | A61G 7/0509 5/624 |
| 7,536,734 | B2 * | 5/2009 | Heimbrock | A61G 13/0009 5/624 |
| 7,657,953 | B2 | 2/2010 | Reckelhoff et al. | |
| 7,951,097 | B2 * | 5/2011 | Schaeffer | A61H 1/0281 601/24 |
| 8,327,480 | B2 | 12/2012 | Ganance et al. | |
| 10,737,602 | B2 * | 8/2020 | Weinberger | B60N 2/02253 |
| 2002/0083527 | A1 * | 7/2002 | Ruehl | A61G 13/10 5/905 |
| 2006/0225215 | A1 * | 10/2006 | Krecow | A61G 13/12 5/648 |
| 2009/0126104 | A1 * | 5/2009 | Lukasiak | A61G 7/1059 5/83.1 |
| 2010/0223727 | A1 * | 9/2010 | Newkirk | A61G 7/0755 5/602 |
| 2016/0120726 | A1 * | 5/2016 | Moriarty | A61G 13/0036 5/649 |
| 2020/0375832 | A1 * | 12/2020 | Wagner | A61G 13/125 |

FOREIGN PATENT DOCUMENTS

| | | | |
|---|---|---|---|
| CN | 201612771 | U | 10/2010 |
| CN | 107951660 | B | 3/2020 |
| EP | 0539089 | A1 | 4/1993 |
| WO | 1993/009750 | A1 | 5/1993 |

* cited by examiner

MEDICAL PROCEDURE FACILITATION SYSTEM

CROSS REFERENCE TO RELATED APPLICATIONS

This U.S. Patent Applications is a continuation-in-part of, and claims priority under 35 U.S.C. § 120 from, U.S. patent application Ser. No. 17/718,240, filed on Apr. 11, 2022, which is a continuation-in-part of U.S. patent application Ser. No. 17/575,426, filed on Jan. 13, 2022, which claims priority under 35 U.S.C. § 119(e) to U.S. Provisional Application 63/142,686, filed on Jan. 28, 2021. The disclosures of these prior applications are considered part of the disclosure of this application and are hereby incorporated by reference in their entireties.

TECHNICAL FIELD

This disclosure relates to a medical lift-assistance device and a medical procedure facilitation system.

BACKGROUND

Medical procedures are many and varied. In the birthing process, for example, Stage 2 is known as the pushing phase. Laboring mothers typically assume a lithotomy position with intermittent hip flexion and execute a Valsalva maneuver to create the expulsive forces necessary to deliver the baby. In this environment, it would be desirable to provide a labor-assist device and system to help the mother to get into and maintain the lithotomy position during contractions.

In one exemplary environment of use, the most common method of giving birth in a hospital setting involves the patient lying on her back and lifting her knees toward her shoulders. For obese women, especially those with epidurals, this process is especially difficult as they often have trouble bearing the weight of each leg or reaching underneath their thighs to grip behind the knee. The patient is often assisted by a family member or a medical professional who tries to hold the leg in the correct position. This puts the women at risk of injury, gives the potential for injury to the assistant based on repetitive lifting, and limits the ability of medical professionals to work efficiently. There are no current solutions available to assist obese patients that mimic the natural posture most needed during this process.

The need for labor assist devices and systems is acutely felt in the case of overweight and obese patients.

In 2019, there were approximately 3.7 million births in the United States, ⅔ of which were delivered vaginally. Labor is characterized by three successive stages—Stage 2 is defined as the pushing phase. A laboring mother typically uses the lithotomy position with intermittent hip flexion and Valsalva to create the expulsive forces necessary to deliver the fetus. This action is repeated with each contraction approximately every three minutes for up to 4 hours. Most laboring mothers utilize epidural analgesia and require the assistance of a healthcare provider or family member to lift and support the legs and thighs. Given the prevalence of obesity and duration of this repetitive lifting, loss of patient autonomy and caregiver injury are significant issues. It has been reported that 8 out of 10 labor and delivery nurses report musculoskeletal pain.

Against this background, it would be desirable to provide a labor assist device that helps restore a laboring mother's independence and lessen the burden for healthcare providers when women labor in the lithotomy position.

Suitable labor assist systems are of interest to medical professionals working in prenatal care, gynecology, or obstetrics who are responsible for the well-being of their patients and the success of a delivery.

There are delivery beds with built-in leg supports that adjust in height in this field. These can be tuned to fit the patient, but are not controlled by the patient and may not lift their legs into the optimal pushing position.

Substitute labor assist products include fabric straps. Fabric straps are looped on each leg and the patient's foot goes through one loop. The patient holds the other loop and pulls on the straps to bring her knees back, with more leverage than she would have to pull from under her knees. Though not a labor assist system, YelloFin stirrups attach to any operating room table. They allow the movement of a patient's legs over a range of abduction and flexion with the help of a linear actuator. YelloFin stirrups are not designed to be adjusted by the patient, but by the surgeon, and provide only static support.

Products currently on the market do not provide any patient-controlled assisting force, or limits on flexion and abduction to prevent injury. They also lack effective attachment to current hospital beds without interfering with the doctor's access to the patient. Thus, a need has arisen for a labor assist system that surpasses the current products and offers a novel solution.

SUMMARY

One aspect of the disclosure provides a medical lift-assistance device including a bracket, a variable assist mechanism, a lifting arm, and a pad sub-assembly. The variable assist mechanism has a strut including a proximal end and a distal end, wherein the proximal end is attached to the bracket. The variable assist mechanism also has a height-adjustment feature including a lower end, an upper end, and an attachment location between the lower end and the upper end, wherein the distal end of the strut is attached to the height-adjustment feature at the attachment location. The variable assist mechanism also has a first gear, a first axle, a first rotational axis extending along the first axle, and a first rotational direction. Here, the first axle is attached to the bracket, the first gear is rotatably attached to the first axle, and the lower end of the height-adjustment feature is attached to the first gear. The variable assist mechanism also includes a second gear, a second axle, and a second rotational axis extending along the second axle, and a second rotational direction. Here, the second axle is attached to the bracket, and the second gear is rotatably attached to the second axle and engages the first gear. The lifting arm includes a proximal end and a distal end wherein the proximal end of the lifting arm is attached to the second gear. The pad sub-assembly is attached to the lifting arm distal from the second axle. The strut applies a strut force to the height adjustment feature at the attachment location capable of causing the first gear to rotate in the first rotational direction. Here, the rotation of the first gear in the first rotational direction causes the second gear and the lifting arm to rotate in the second rotational direction.

Embodiments of the disclosure may include one or more of the following optional features. In some embodiments, the first direction is opposite the second direction. The medical lift-assistance device may further include a locking mechanism that includes a third gear, a pawl, and a handle, wherein the locking mechanism is attached to the bracket and the third gear is rotatably attached to the second axle and attached to the second gear such that the third gear rotates with the second gear. Here, the pawl has a proximal end and a distal end, wherein the handle is attached to the proximal end of the pawl and the distal end of the pawl is capable of engaging the third gear such that the second gear, the third gear, and the lifting arm are prevented from rotating in the second rotational direction.

In some examples, the height-adjustment feature is defined by a threaded shaft and a third rotational axis, wherein the threaded shaft extends along the third rotational axis from the lower end to the upper end of the height-adjustment feature. The height-adjustment feature also includes a ball nut rotatably attached to the threaded shaft at the attachment location, wherein the distal end of the strut is fixed to the ball nut at the attachment location. The height-adjustment feature also includes a rotation feature attached to the threaded shaft. Here, rotating the rotation feature and the threaded shaft causes the ball nut and the attachment location to translate along the threaded shaft. In these examples, the variable assist mechanism further includes a variable assist distance between the attachment location of the height-adjustment feature and the first rotational axis, wherein translating the ball nut and the attachment location along the threaded shaft causes the variable assist distance to change. Here, the variable assist mechanism may include a first variable assist distance and a second variable assist distance, wherein the strut includes a strut length from the proximal end of the strut to the distal end of the strut and the strut length can vary between a first strut length and a second strut length. Moreover, the first gear receives a first moment from the strut applying the strut force to the height-adjustment feature when the strut has the first strut length and the variable assist mechanism has the first variable assist distance, and the first gear receives a second moment from the strut applying the strut force to the height-adjustment feature when the strut has the second strut length and the variable assist mechanism has the second variable assist distance. In some examples, when the first variable assist distance is greater than the second variable assist distance, the first moment is greater than the second moment.

In some embodiments, the variable assist mechanism further includes an electric motor attached to the rotation feature. The rotation feature may be attached to the threaded shaft at the lower end of the height-adjustment feature. The rotation feature may be integral with the threaded shaft. The lifting arm may have a first pair of tubes including a first outer tube having a first diameter and a first inner tube having a second diameter smaller than the first diameter wherein the first inner tube has a first series of engagement holes, a second pair of tubes including a second outer tube having a third diameter and a second inner tube having a fourth diameter smaller than the third diameter wherein the second inner tube has a second series of engagement holes, and a spring-biased handle and a pair of locking features, wherein the spring-biased handle is attached to the pair of locking features. Here, the pair of locking features may be operable between a locked position and an unlocked position, wherein the pair of locking features engage a respective one of the first series of engagement holes and a respective one of the second series of engagement holes in the locked position. The lifting arm may further include a lifting arm axis that extends from the proximal end to the distal end of the lifting arm. Here, the pad sub-assembly includes a translation axis that extends along a midline of the pad sub-assembly, wherein the translation axis is orthogonal to the lifting arm axis. Here, the pad sub-assembly further includes a translation mechanism having a locking hole where the translation mechanism is attached to the distal end of the lifting arm and a spring-biased locking pin having a locked position and an unlocked position. Here, the spring-biased locking pin engages the locking hole in the locked position such that the pad sub-assembly is incapable of translating along the translation axis, wherein the spring-biased locking pin disengages the locking hole in the unlocked position such that the pad sub-assembly is capable of translating along the translation axis.

Another aspect of the disclosure provides a medical procedure facilitation system including a pair of brackets, a pair of variable assist mechanisms, a pair of lifting arms, and a pair of pad sub-assemblies. The pair of brackets are each attachable to an operating platform. The pair of variable assist mechanisms each have a strut including a proximal end and a distal end such that the proximal end is attached to a corresponding one of the brackets. Each variable assist mechanism also has a height-adjustment feature having a lower end, an upper end, and an attachment location between the lower end and the upper end. Here, the distal end of the strut is attached to the height-adjustment feature at the attachment location. Each variable assist mechanism also includes a first gear, a first axle, a first rotational axis extending along the first axle, and a first rotational direction, wherein the first axle is attached to a corresponding one of the brackets. Here, the first gear is rotatably attached to the first axle and the lower end of the height-adjustment feature is attached to the first gear. Each variable assist mechanism also includes a second gear, a second axle, and a second rotational axis extending along the second axle, wherein the second axle is attached to a corresponding one of the brackets and the second gear is rotatably attached to the second axle and engages the first gear. Each lifting arm includes a proximal end and a distal end, wherein the proximal end is attached to a corresponding one of the second gears. Each pad sub-assembly is attached to a corresponding one of the lifting arms distal from the second axle. Each strut applies a respective strut force to a corresponding one of the height-adjustment features at the attachment location capable of causing the first gear to rotate in the first rotational direction. Here, the rotation of the first gear in the first rotational direction causes the second gear and the lifting arm to rotate in the second rotational direction.

Embodiments of the disclosure may include one or more of the following optional features. In some embodiments, the first rotational direction is opposite the second rotational direction. In some examples, the medical facilitation system includes a pair of locking mechanisms each including a third gear, a pawl, and a handle, wherein each locking mechanism is attached to a corresponding one of the brackets. Here, the third gear is rotatably attached to a corresponding one of the second axles and attached to a corresponding one of the second gears such that the third gear rotates with the corresponding one of the second gears, wherein the pawl has a proximal end and a distal end, the handle is attached to the proximal end of the pawl, and the distal end of the pawl is capable of engaging the third gear such that the a corresponding one of the second gears, the third gear, and a corresponding one of the lifting arms are prevented from rotating in the second rotational direction.

In some embodiments, each height-adjustment feature is defined by a threaded shaft and a third rotational axis, wherein the threaded shaft extends along the third rotational axis from the lower end to the upper end of the height-adjustment feature. Each height-adjustment feature further includes a ball nut rotatably attached to the threaded shaft at the attachment location, wherein the distal end of a corresponding one of the struts is attached to the ball nut at the attachment location and a rotation feature attached to the threaded shaft. Here, rotating the rotation feature and the threaded shaft causes the ball nut and the attachment location to translate along the threaded shaft. In these embodiments, each variable assist mechanism further includes a variable assist distance between the attachment location of a corresponding one of the height-adjustment features and the first rotational axis, wherein translating the ball nut and the attachment location along the threaded shaft causes the variable assist distance to change.

Each variable assist mechanism may further include a first variable assist distance and a second variable assist distance, wherein each strut includes a strut length from the proximal end of the strut to the distal end of the strut and the strut length can vary between a first strut length and a second strut length. Moreover, a corresponding one of the first gears receives a first moment from the strut applying the strut force to the height-adjustment feature when the strut has the first strut length and the variable assist mechanism has the first variable assist distance. Here, the corresponding one of the first gears receives a second moment from the strut applying the strut force to the height-adjustment feature when the strut has the second strut length and the variable assist mechanism has the second variable assist distance. In some examples, when the first variable assist distance is greater than the second variable assist distance, the first moment is greater than the second moment. Each variable assist mechanism may further include an electric motor attached to a corresponding one of the rotation features. In some examples, each rotation feature is attached to the threaded shaft at the lower end of a corresponding one of the height-adjustment features. Each rotation feature may be integral with a corresponding one of the threaded shafts.

In some embodiments, each lifting arm further has a first pair of tubes including a first outer tube having a first diameter and a first inner tube having a second diameter smaller than the first diameter, the first inner tube having a first series of engagement holes, a second pair of tubes including a second outer tube having a third diameter and a second inner tube having a fourth diameter smaller than the third diameter, the second inner tube having a second series of engagement holes, and a spring-biased handle and a pair of locking features, wherein the spring-biased handle is attached to the pair of locking features. Here, each pair of locking features are operable between a locked position and an unlocked position, wherein each pair of locking features engage a respective one of the first series of engagement holes and a respective one of the second series of engagement holes in the locked position. In some examples each lifting arm further includes a lifting arm axis that extends from the proximal end to the distal end of the lifting arm, wherein each pad sub-assembly includes a translation axis that extends along a midline of the pad sub-assembly such that the translation axis is orthogonal to the lifting arm axis. Here, each pad sub-assembly may further include a translation mechanism having a locking hole with the translation mechanism attached to the distal end of a corresponding one of the lifting arms and a spring-biased locking pin having a locked position and an unlocked position. The spring-biased locking pin engages the locking hole in the locked position such that the pad sub-assembly is incapable of translating along the translation axis and the spring-biased locking pin disengages the locking hole in the unlocked position such that the pad-subassembly is capable of translating along the translation axis.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
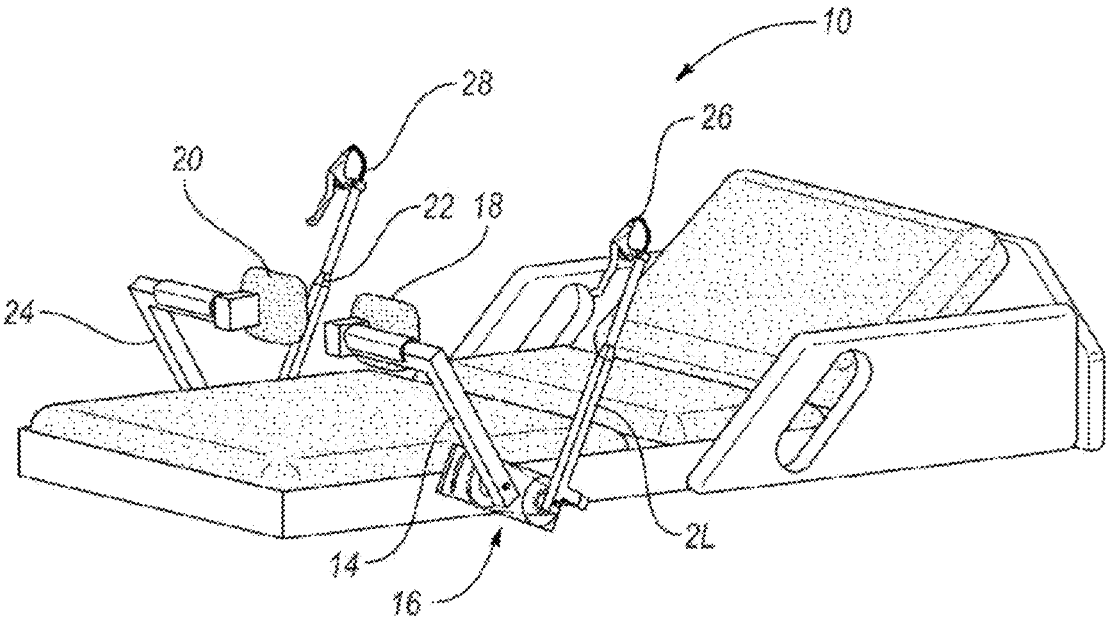
FIG. 1 depicts a front quartering perspective view of a medical procedure facilitation system secured to an operating platform, according to a first embodiment of the present disclosure.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

An improved design of a medical procedure facilitation system has some features that are in common with a previous design disclosed in the parent application. Before turning to the improved design, some aspects of embodiments disclosed in the parent application will first be outlined.

Features Disclosed in the Parent Application

One embodiment of an earlier design includes two thigh-lifting arms that are fitted to the sides of a labor and delivery bed. A thigh pad is attached to each arm. The position of each pad can be moved perpendicular and parallel to the arm to accommodate women of different sizes. In addition, the pad can rotate about two axes. The first axis is perpendicular to the face of the pad and the second axis is perpendicular to the arm. During a contraction, adjustable handles at the top of each arm allow the patient to pull on the arms to assist her in assuming the lithotomy position.

The parent application disclosed several embodiments of the labor assist system which provide force to alleviate patient strain. The system is coupled to a hospital bed. In one example, the arms of the system are mounted parallel to the sides of the bed. One arm is on the left side and one arm is on the right side. In one case, two arms are secured to a mounting plate which then couples to the hospital labor bed. In one embodiment, the arms rotate from the plane of the bedplate from a parallel position to a position up to approximately 80-85 degrees above parallel.

Crossbars are fixed to the arms of the system at 90 degrees pointing into and parallel to the bed. Leg pads or thigh pad plates 4 are fixed to the crossbars of the system and are positioned on the backside of the patient's thigh directly under the knee. The leg pads are free to rotate to adjust the patient's posture and leg's desired position.

The main arms of the system are formed by telescoping tubing that allows the system to be adjusted based on the dimensions and parameters of the patient. The system has adjustable handgrips or handles located on the arm and on the inside of the leg pad for the patient to grasp while pulling her legs.

One embodiment has independent sides. This allows the patient to move each leg independently. There are many advantages to this option based on the patient and different techniques and positioning (such as the OP position) for child labor. The first option would be independent, and the second would be to have the sides connected and move together.

It will be appreciated that the use of the assisting force technology design for female patients during child and other clinical procedures could benefit male patients during pelvic area procedures and operations.

As noted earlier, the system disclosed in the parent application offered some opportunities for improvement. Accordingly, this disclosure now turns to systems that are embodied in an improved design.

Subsystems Embodied in a First Improved Design

Figure 2:
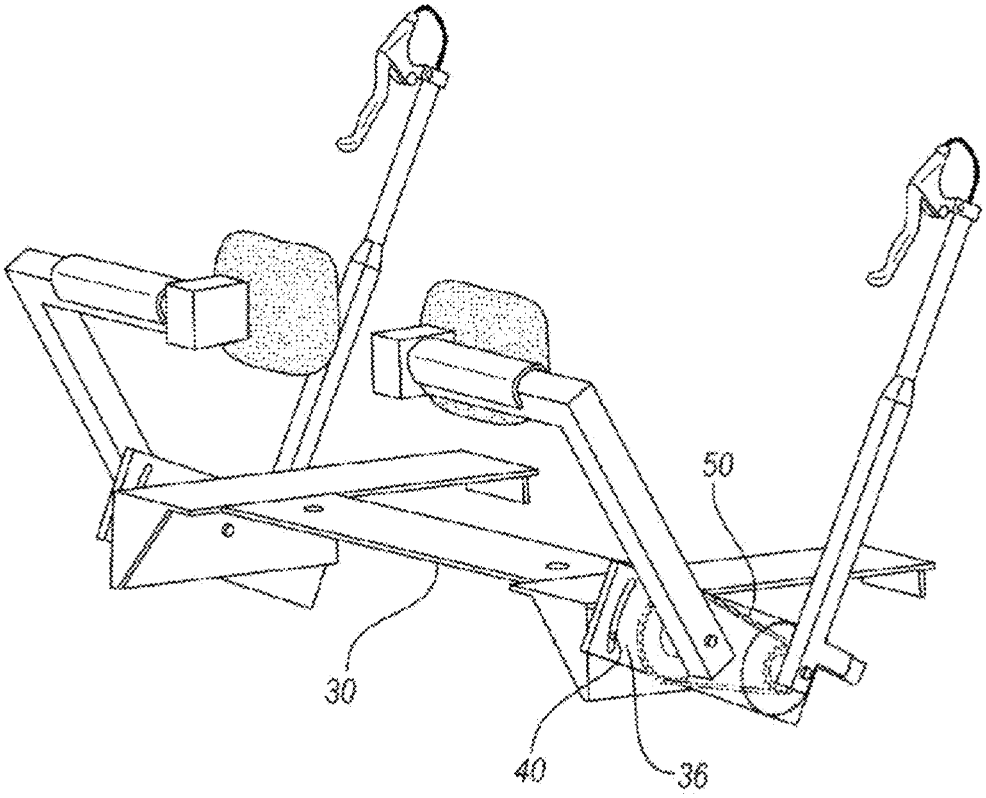
FIG. 2 depicts a front quartering view of the system when separated from the operating platform, according to the first embodiment of the present disclosure.
Figure 3:
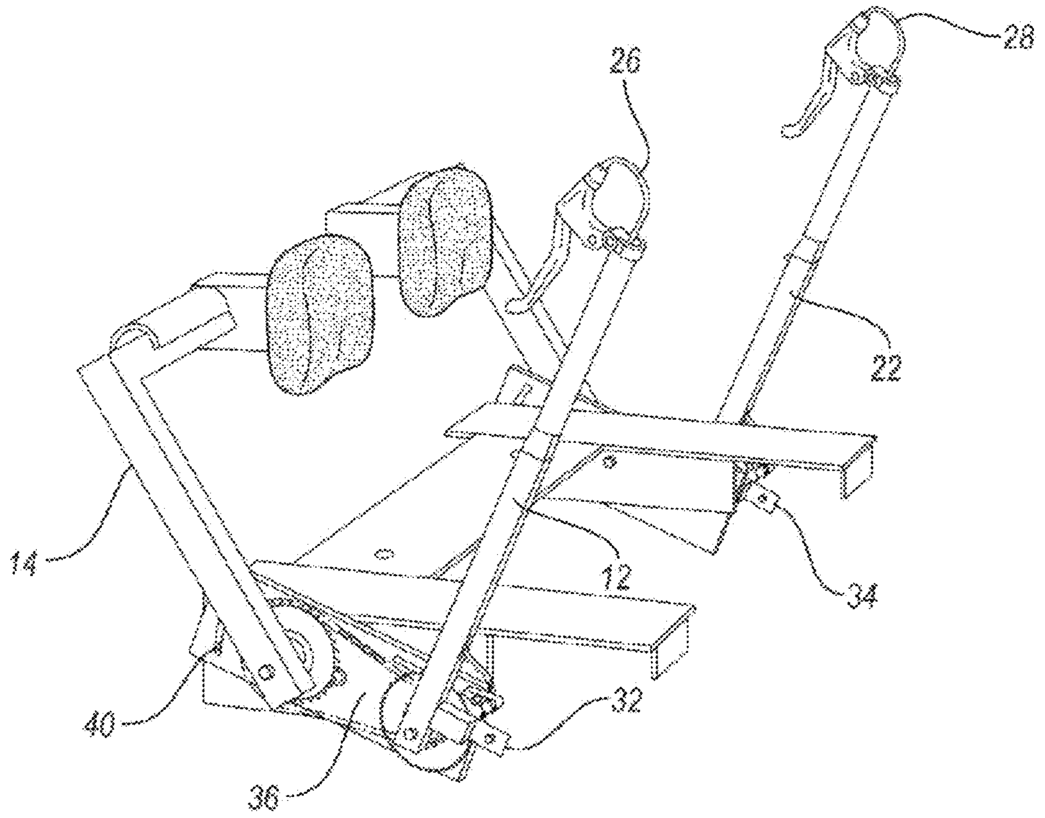
FIG. 3 depicts a rear quartering view of the system when separated from the operating platform, according to the first embodiment of the present disclosure.

Turning first to FIGS. 1-3, one embodiment of an improved system design of a medical procedure facilitation device 10 has driving (assisting) arms 12, 22 and driven (lifting) arms 14, 24 on each side of the bed that use associated chain and sprocket mechanisms 16 to communicate forces from the patient's arms to the patient's legs, thereby providing thigh-lifting assistance.

In a preferred embodiment, the assisting arms 12, 22 may move independently of each other, i.e., they are de-coupled. Similarly for the lifting arms 14, 24.

Each thigh pad 18,20 is attached to the end of an associated lifting arm 14, 24. Each thigh pad 18 and 22 goes under the patient's thigh just above her knee. The mother grasps the handgrip 26, 28 of an associated assisting arm 12, 22 and pulls. The chain and sprocket mechanism 16 (one on each side of the bed) connects an assisting arm 12 to the associated lifting arm 14. The arms 12, 22 augment the patient's input force, thereby helping to lift her thighs.

The thigh pads 18 and 20 are respectively connected to the lifting arms 14, 24. The handles 26, 28 for the patient to grasp are positioned proximate to the upper ends of the assisting arms 12, 22. The sprocket and chain mechanism 16 is deployed at the lower ends of the assisting and lifting arms.

Figure 5:
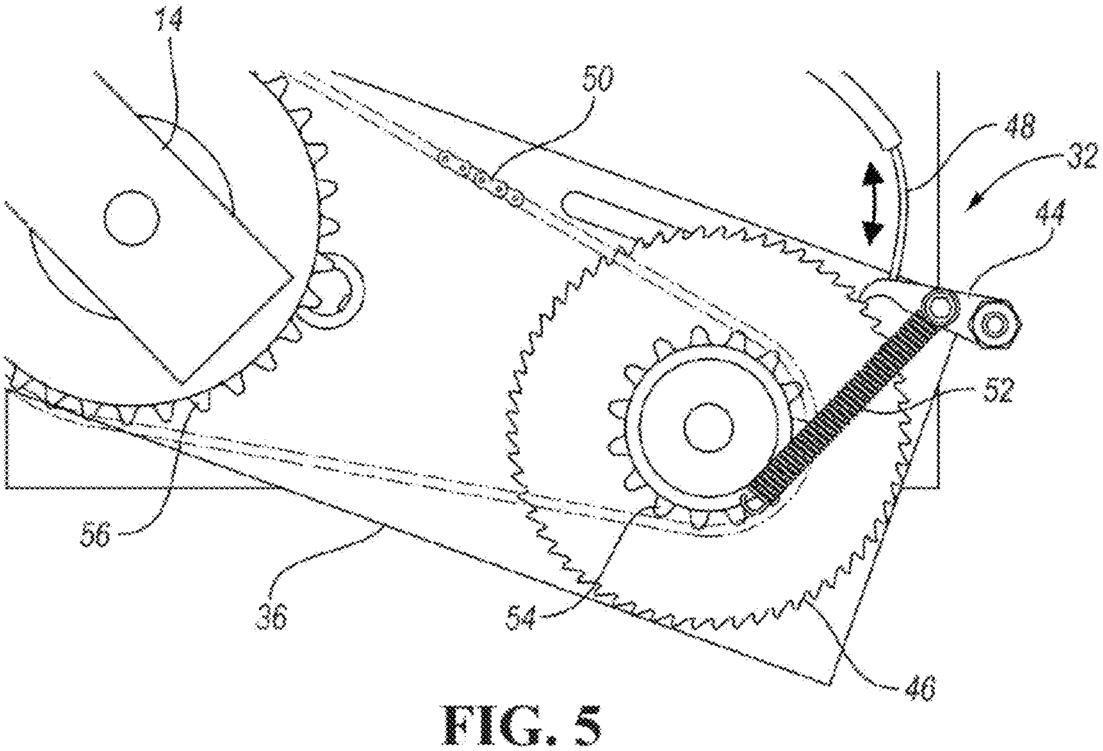
FIG. 5 depicts a side view of a ratchet and pawl mechanism.
Figure 6:
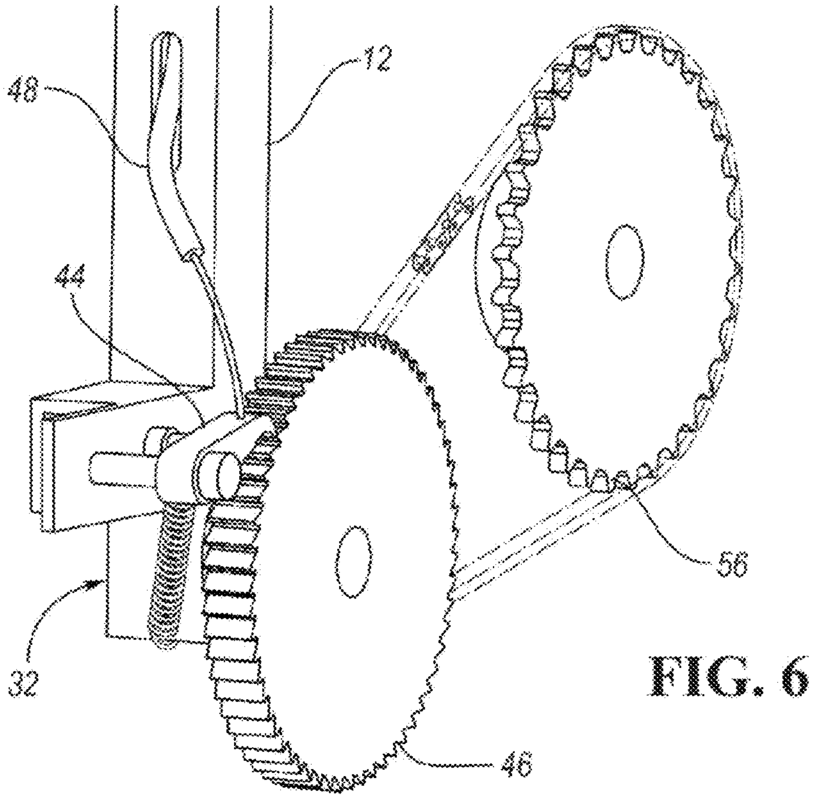
FIG. 6 depicts a rear right perspective view of the ratchet and pawl mechanism, according to the first embodiment of the present disclosure.
Figure 7:
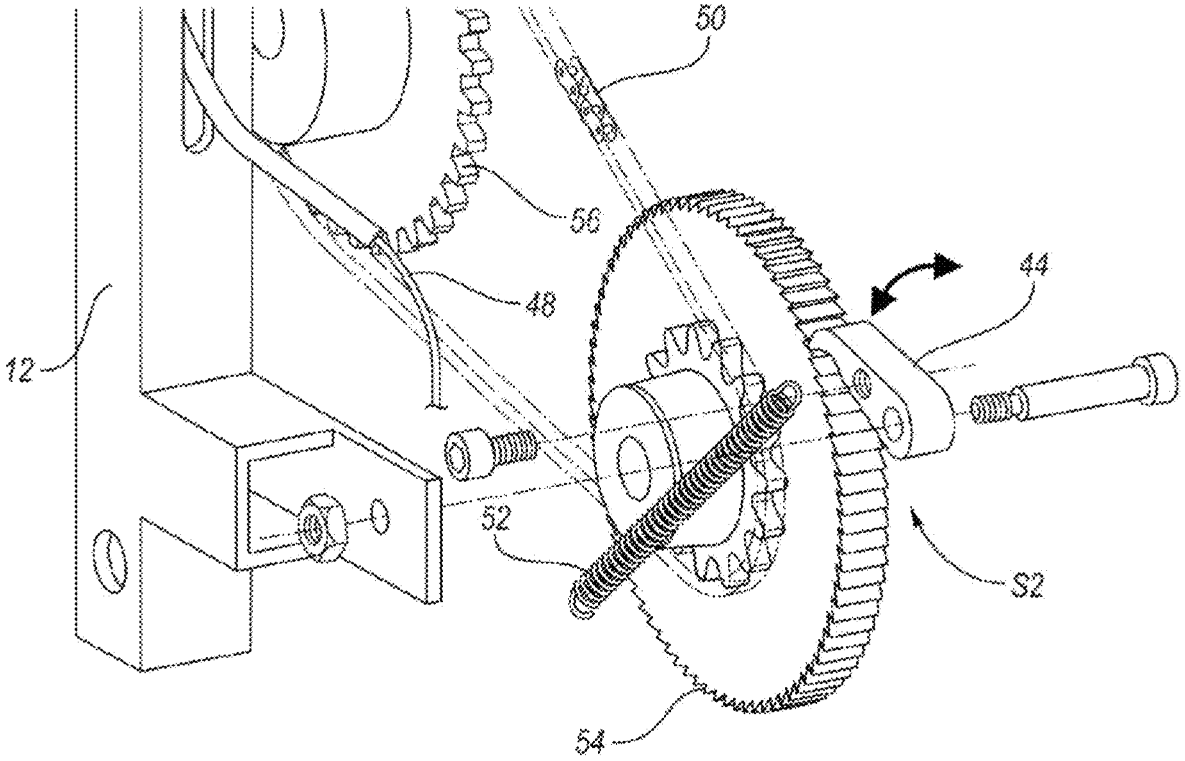
FIG. 7 depicts a rear left exploded view of the ratchet and pawl mechanism, according to the first embodiment of the present disclosure.

It will be appreciated that drive mechanisms other than a chain and sprocket arrangement may perform satisfactorily. FIGS. 5-7 suggest a belt 50 that engages the assisting arm sprocket 52 and the lifting arm sprocket 54. Alternative examples include a belt and pulley (preferably, non-slip)

arrangement and a hybrid approach, wherein the grooves of a pulley house teeth that engage an overlying belt with or with recesses that receive the teeth. Other alternative examples include beltless gearing arrangements.

Preferably, a bedplate 30 (FIG. 2) connects the respective assisting arms 12, 22 to sets of arms on each side, and in one embodiment is secured to the operating platform, such as a bed underneath the mattress or an operating table.

Figure 4:
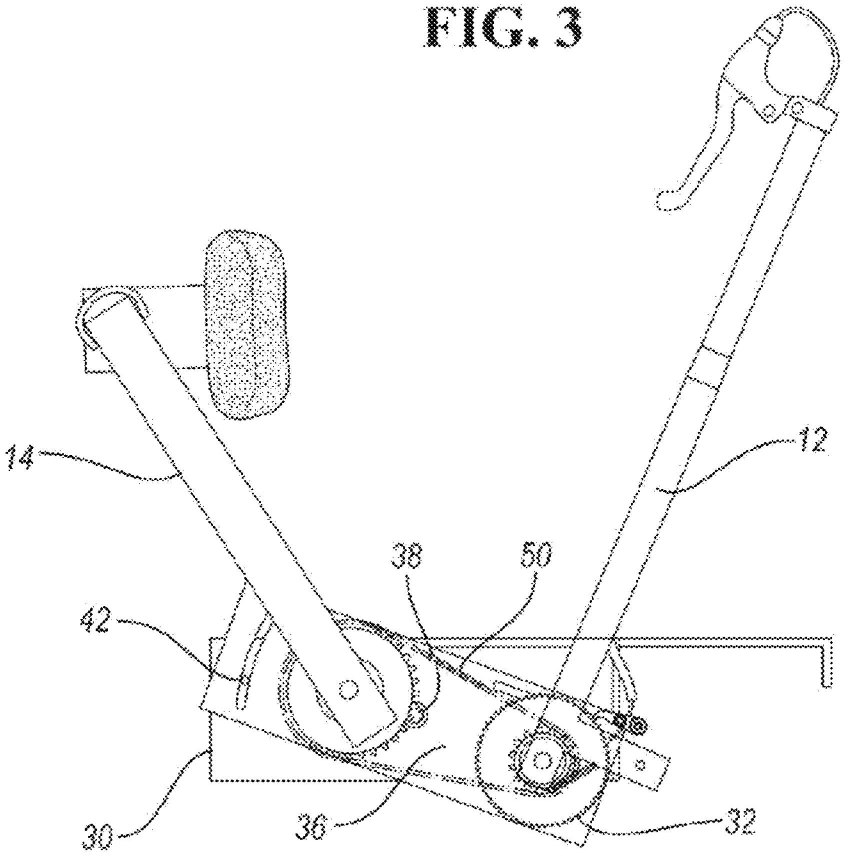
FIG. 4 depicts a chain and sprocket mechanism that links the lower end regions of an assisting arm and a lifting arm, according to the first embodiment of the present disclosure.

A side view of a representative chain and sprocket embodiment appears in FIG. 4. The chain and sprocket mechanism 16 provides a mechanical advantage to the patient. For every pound of force that the patient exerts by pulling back on the handles 26, 28 of the assisting arms 12, 22 a larger force is exerted by the thigh pads 18, 20 extending from the lifting arms 14, 24 to her thighs. Therefore, the device assists the patient in assuming and maintaining the lithotomy position during contractions. At the end of the contraction, the patient lowers the handles 12, 22 and her legs return to the resting position.

A ratchet and pawl mechanism 32 (FIGS. 3-7) is attached to a lower end region of each assisting arm 12, 22. The ratchet and pawl mechanism (one on each side of the operating platform) is linked to the patient's handgrip 28. Each handgrip 28 has an associated lever that holds a pawl 44 away from the ratchet 46 when the patient grasps the lever and pulls it toward the handgrip 28. If the lever is not depressed, then the ratchet 46 is engaged with the pawl 44 under the influence of a spring 52. This prevents the upper-end region of the assisting arm 12 from moving away from the patient. When the ratchet 46 is engaged with the pawl 44, the lifting arm 14 is also prevented from rotating and allowing the patient's thighs to lower.

The pawl 44 is held in the default position, engaged with the ratchet 46, with the spring 52. The ratchet and pawl system prevents the lifting arm 14, 24 that supports the thighs of the patient from swinging down and possibly hitting a caregiver if the patient suddenly releases the handgrip 28.

Thus, each ratchet and pawl mechanism 32 (one on each side of the operating platform) ensures that the associated assisting arms 12, 22 and lifting arms 14, 24 respectively can only move when the patient squeezes the associated lever 26, 28. A rod or cable 48 connects a grasping handle 26, 28 to an associated spring-loaded pawl 32, 34 that normally lies in a seated (engaged) position. Each ratchet 46 may share an axle with an assisting arm 12, and 22 and engage a respective pawl 44.

Each ratchet 44 preferably is spring-biased. Its rotation is impeded by an associated pawl 46. The pawl 44 is engaged when the gripping handle 28 is released, i.e., not squeezed. When a pulling force is exerted by the patient, the ratchet 46 rides over the pawl 44, thereby permitting movement of the associated assisting and lifting arms 12, 14. Upon force release, engagement of the pawls 44 and ratchets 46 occurs and the system reverts to a locked state. The ratchet and pawl mechanism 32 thus allows the patient to lock the medical procedure facilitation (e.g., labor assist) device 10 in any position. For instance, the patient may want to lock the system during a contraction when she is in the lithotomy position.

In addition, the ratchet and pawl mechanism 32 on each side of the operating platform and associated handles 26, 28 ensure that the lifting arms 14, 24 will not fall if the patient unexpectedly releases either handle 26, 28. This feature protects both the patient and the medical professionals rendering care.

The lower end regions of the arms 12, 22, 14, 24, sprockets 16 on each side of the operating platform and ratchet 32 on each side of the operating platform are mounted on plates 36 (one per side) (FIG. 2-4) that can rotate in the vertical plane relative to the operating platform. Each plate 36 rotates about a stationary bolt 38 that secures the mounting plate 36 to the operating platform. The mounting plate 36 has slot 40 which receives a stud 42 to limit rotation of the mounting plate 36. This swiveling feature of the mounting plate 36 allows the medical procedure facilitation system 10 to be adjusted to accommodate patients of different sizes.

Other features allow the labor assist device to accommodate patients of different sizes. In one embodiment, an extendable assisting arm 12, 22 is provided. In another embodiment, a mechanism is provided that allows the thigh pads 18, 20 to move perpendicularly to the centerline of the operating platform.

The labor assist device embodiment in particular not only improves the patient's experience but also reduces the need for medical professionals to assist the patient in lifting her legs. Often caregivers must assist repetitively from positions that put them at risk for sustaining musculoskeletal injuries. In situations where the patient requires additional help, caregivers will be able to apply supplements to the assisting force, thereby safely elevating or positioning the lifting arms 14, 24 to achieve the desired pushing position.

To recap, in one embodiment of the disclosed medical procedure facilitation system 10, a labor assist system can be used by both the laboring mother and the caregiver. The labor assist system utilizes a patient-controlled mechanical advantage to safely support and assist in lifting the lower extremities repeatedly during the second stage of labor. Attached to a pair of assisting arms 12, 22 are grasping handles 26, 28 that allow the mother to exert a force that is communicated through a chain and sprocket mechanism 16 to an associated lifting arm 14, 24 and thigh pad 18, 20 which underlie the thighs, thereby raising her legs to the desired position for pushing.

In one representative embodiment, a mechanical advantage provided by the chain and sprocket mechanism 16 is such that a force that is applied to the thigh pads 18, 20 is about twice as large (e.g., a multiplier of 1.98-2.10) as the force exerted by the patient. For example, the sprocket associated with the assisting arms 12, 22 may have about one-half of the number of teeth (e.g., assisting:lifting=20:40) on the sprocket associated with the lifting arms. This enables the mother to achieve and maintain the desired position for pushing during a contraction. At the end of the contraction, the system allows the mother's legs to be returned to their resting position. Such a system assists the mother in expending less effort lifting her legs, thereby saving energy for pushing. If required, a caregiver can utilize the device to aid the laboring mother.

TABLE OF REFERENCE NUMERALS

| Reference No. | Component |
|---|---|
| 10 | Medical Procedure Facilitation System |
| 12 | Assisting (Driving) Arm |
| 14 | Lifting (Driven) Arm |
| 16 | Chain and Sprocket Subsystem (One per Side of Operating Platform) |
| 18 | Adjustable Thigh Support Pad |
| 20 | Adjustable Thigh Support Pad |
| 22 | Assisting (Driving) Arm |

-continued

| TABLE OF REFERENCE NUMERALS | |
|---|---|
| Reference No. | Component |
| 24 | Lifting (Driven) Arm |
| 26 | Hand Grip |
| 28 | Hand Grip |
| 30 | Foundation Plate |
| 32 | Ratchet and Pawl Subsystem (One per Side of Operating Platform) |
| 34 | Ratchet and Pawl Subsystem (One per Side of Operating Platform) |
| 36 | Mounting Plate |
| 38 | Bolt |
| 40 | Slot |
| 42 | Stud |
| 44 | Pawl |
| 46 | Ratchet |
| 48 | Rod |
| 50 | Chain or belt |
| 52 | Spring |
| 54 | Assisting arm sprocket |
| 56 | Lifting arm sprocket |

Subsystems Embodied in a Second Improved Design

Referring now to FIGS. 8-15, a second embodiment of an improved system design of a medical procedure facilitation system 110 includes a pair of medical lift assistance devices 112. Each medical lift assistance device 112 (e.g., a first medical lift assistance device 112, 112*a* and a second medical lift assistance device 112, 112*b*) is independently operable and attachable to an operating platform 102, such as a hospital bed or operating table having at least one lateral edge and/or at least one leg. The pair of medical assist devices 112 also may be coupled or connected to each other. Each medical lift assistance device 112*a*, 112*b* includes a respective bracket 118 operable to attach to the at least one lateral edge and/or the at least one leg of the operating platform 102. In some examples, the bracket 118 includes one or more brackets of any suitable material capable of attaching the medical lift assistance device 112 to the operating platform 102. In the example shown, the first medical lift assistance device 112*a* from the pair of medical lift assistance devices 112 is attached to a first side of the operating platform 102 and the second medical lift assistance device 112*b* from the pair of medical lift assistance devices 112 is attached to a second side of the operating platform 102 opposite the first side of the operating platform 102. In some embodiments, each medical lift assistance device 112*a*, 112*b* includes a variable assist mechanism 120 which may have a cover 122.

Figure 13A:
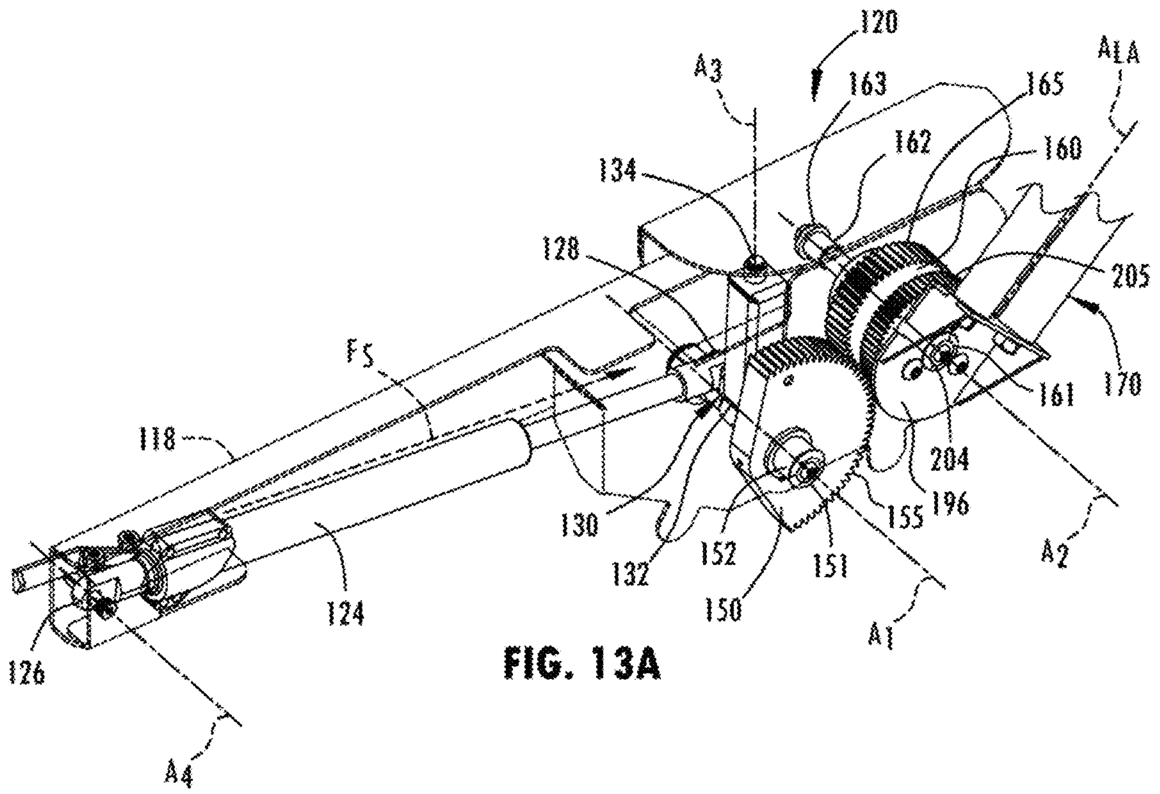
FIG. 13A depicts a top rear perspective view of a variable assist mechanism of one of the medical lift-assistance devices, according to the second embodiment of the present disclosure.
Figure 13B:
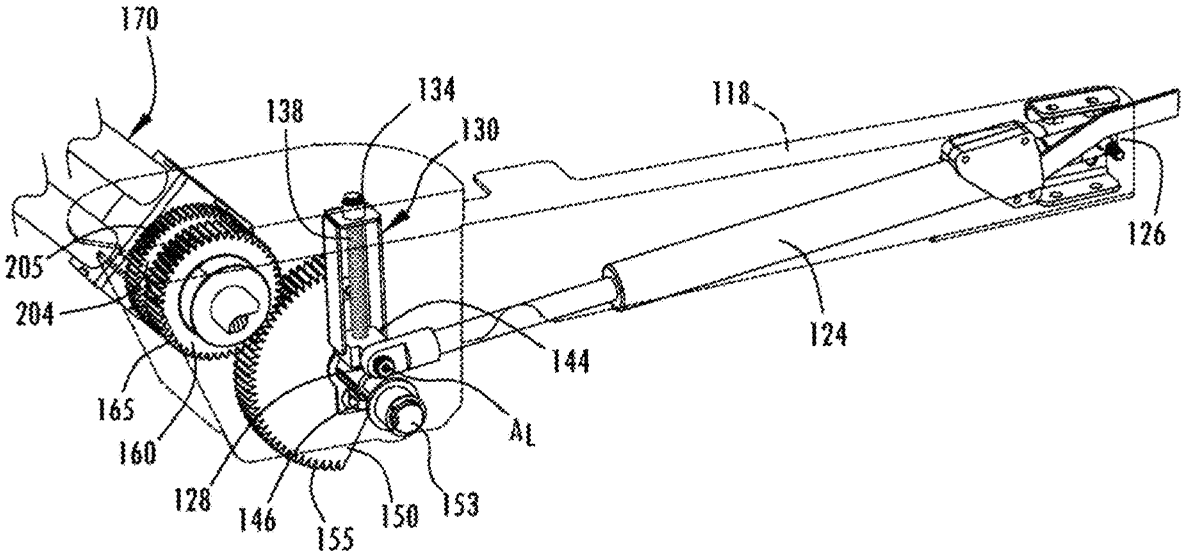
FIG. 13B depicts a top front perspective view of the variable assist mechanism of one of the medical lift-assistance devices, according to the second embodiment of the present disclosure.
Figure 13C:
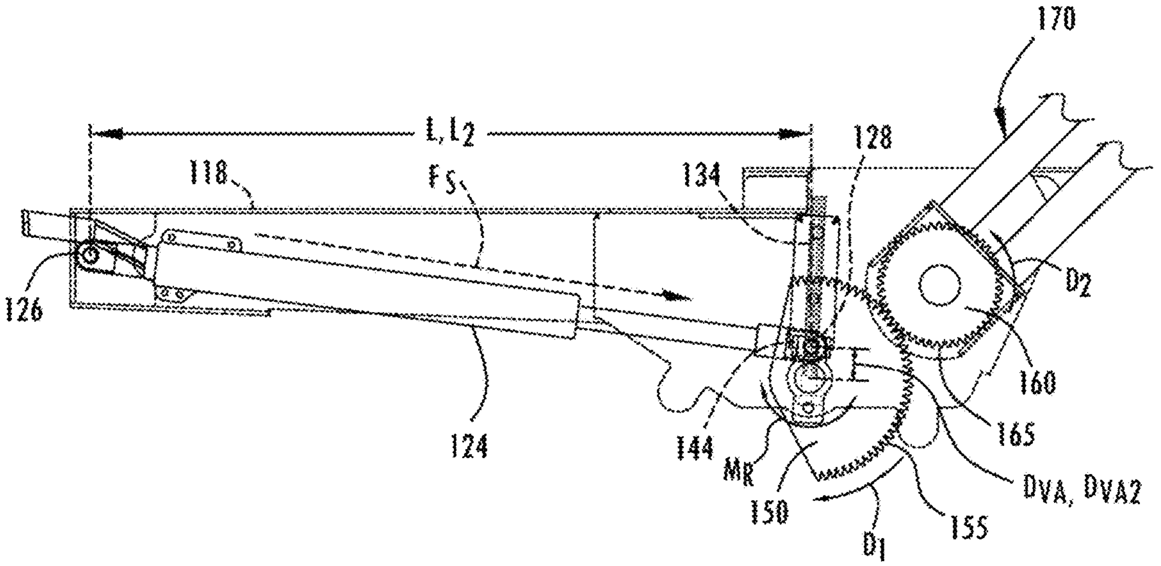
FIG. 13C depicts a side view of the variable assist mechanism of one of the medical lift-assistance devices having a second variable assist distance, according to the second embodiment of the present disclosure.

FIGS. 13A-13C, shows the variable assist mechanism 120 of a corresponding one of the medical lift assistance devices 112. The variable assist mechanism 120 includes a strut 124 having a proximal end 126 and a distal end 128. The proximal end 126 is attached to a corresponding one of the brackets 118. The variable assist mechanism 120 also includes a height-adjustment feature 130 having a lower end 132, an upper end 134, and an attachment location $A_L$ located between the lower end 132 and the upper end 134. The distal end 128 of the strut 124 is attached to the height-adjustment feature 130 at the attachment location $A_L$. The height adjustment feature 130 may also include a threaded shaft 138 and a third rotational axis $A_3$ such that the threaded shaft 138 extends along the third rotational axis $A_3$ from the lower end 132 to the upper end 134 of the height-adjustment feature 130. In some examples, the threaded shaft 138 is a bolt having a threaded body and a head.

In some embodiments, the height adjustment feature 130 includes a ball nut 144 and a rotation feature 146. The ball nut 144 is rotatably attached to the threaded shaft 138 at the attachment location $A_L$ such that the distal end 128 of the strut 124 is attached to the ball nut 144 at the attachment location $A_L$. The rotation feature 146 may be attached to the threaded shaft 138 at the lower end 132 of the height adjustment feature 130. In some embodiments, the rotation feature 146 is integral with the threaded shaft 138. That is, the rotation feature 146 may be the head integral with the threaded body of the bolt. The rotation feature 146 is operable to be rotated by a user of the medical lift assistance device 112 (e.g., the patient), or a medical practitioner or assistant, causing the threaded shaft 138 to rotate. For instance, the user may rotate the rotation feature 146 using a tool, such as a wrench, to rotate the rotation feature. In some embodiments, the variable assist mechanism 120 includes an electric motor coupled to the threaded shaft 138 in addition to, or in lieu of, the rotation feature 146. Here, the electric motor is configured to rotate the threaded shaft 138 about the third rotational axis $A_3$.

Figure 13D:
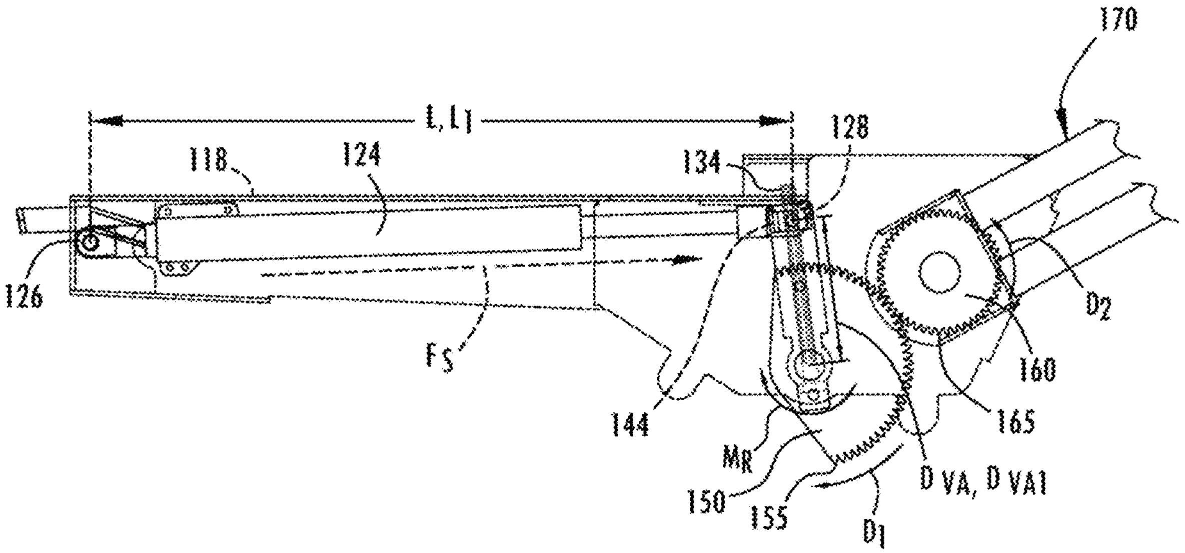
FIG. 13D depicts a side view of the variable assist mechanism of one of the medical lift-assistance devices having a first variable assist distance, according to the second embodiment of the present disclosure.

Rotating the rotation feature 146 causes the threaded shaft 138 to rotate causing the ball nut 144 and the attachment location $A_L$ to translate along the threaded shaft 138. That is, the ball nut 144 includes multiple ball bearings (not shown) internal to the ball nut 144 that engage threads of the threaded shaft 138. Accordingly, as the threaded shaft 138 rotates, the ball nut 144 and the attachment location $A_L$ translate along the threaded shaft 138. As a result of the ball nut 144 translating along the threaded shaft 138, the distal end 128 of the strut 124 translates with the ball nut 144 because the distal end 128 is attached to the ball nut 144. That is, the strut 124 has a strut length L that can vary between a first strut length $L_1$ and a second strut length $L_2$ and the strut length L also can vary to numerous other lengths $L_3$, $L_4$, etc. (not shown). Thus, the distal end 128 of the strut 124 translates with the ball nut 144 as the proximal end 126 of the strut 124 rotates about a fourth rotational axis $A_4$ (FIG. 13A). That is, the proximal 126 end of the strut 124 may be rotatably attached to the bracket 118 such that the entire length L of the strut 124, including the distal end 128 of the strut 124, rotates about the fourth rotational axis $A_4$ as the ball nut 144 translates along the threaded shaft 138. FIG. 13D shows the strut 124 having the first strut length $L_1$ and FIG. 13C shows the strut 124 having the second strut length $L_2$.

The variable assist mechanism 120 also includes a first gear 150, a first axle 152 having a proximal end 151 and a distal end 153, a first rotational axis $A_1$ extending along the first axle 152 from the proximal end 151 to the distal end 153 of the first axle 152, and a first rotational direction $D_1$. The first axle 152 is attached to a corresponding one of the brackets 118. In some examples, the first axle 152 is fixed to the corresponding one of the brackets 118 such that the first axle 152 does not rotate with respect to the corresponding one of the brackets 118. Moreover, the first gear 150 is rotatably attached to the first axle 152 and the lower end 132 of the height-adjustment feature 130 is attached to the first gear 150. As such, the first gear 150 is operable to rotate in the first rotational direction $D_1$ about the first rotational axis $A_1$ (i.e., about the first axle 152). The first gear 150 has a plurality of teeth 155 extending radially from the first gear 150. The teeth 155 may not need to extend around an entire circumference of the first gear 150.

The strut 124 applies a strut force $F_S$ to the height-adjustment feature 130 at the attachment location $A_L$ capable of causing the first gear 150 to rotate in the first rotational direction $D_1$. That is, the strut 124 is biased to expand (i.e., its natural state) thereby applying the strut force $F_S$. The proximal end 126 of the strut 124 is attached to the bracket 118 such that the strut force $F_S$ causes the distal end 128 to extend outwardly. This extension of the distal end 128 of the strut 124 changes the strut length L and the strut force $F_S$ is applied at the attachment location $A_L$. Consequently, because the height adjustment feature 130 is attached to the first gear 150, the height adjustment feature 130 and the first gear 150 rotate in the first rotational direction $D_1$ caused by the strut force $F_S$ is applied at the attachment location $A_L$. That is, the proximal end 126 of the strut 124 is attached to the bracket 118 such that the distal end 128 of the strut 124 extends causing the strut force $F_S$ to be applied to the height-adjustment feature 130 at the attachment location $A_L$. In short, the strut force $F_S$ applied to the height-adjustment feature 130 causes a moment $M_R$ at the first gear 150 thereby causing the first gear 150 to rotate in the first rotational direction $D_1$ about the first rotational axis $A_1$.

The variable assist mechanism 120 includes a variable assist distance $D_{VA}$ between the attachment location $A_L$ of the height-adjustment feature 130 and the first rotational axis $A_1$ (FIGS. 13C and 13D). Notably, the variable assist distance $D_{VA}$ can be changed by the user, medical practitioner or assistant. That is, because the rotation feature 146 and the threaded shaft 138 may be rotated about the third rotational axis $A_3$, which causes the ball nut 144 and the attachment location $A_L$ to translate along the threaded shaft 138, the variable assist distance $D_{VA}$ between the attachment location $A_L$ and the first rotational axis $A_1$ is capable of changing. Thus, the rotation feature 146 may be rotated to locate or re-locate the ball nut 144 at any point along the threaded shaft 138, and thus, configure the variable assist distance $D_{VA}$.

Increasing the variable assist distance $D_{VA}$ creates a greater moment arm between the attachment location $A_L$ and the first axle 152. More specifically, when the variable assist distance $D_{VA}$ is increased (FIG. 13D) and the strut length L decreases, the moment $M_R$ at the first gear 150 is increased because of the greater moment arm. On the other hand, decreasing the variable assist distance $D_{VA}$ (FIG. 13C) creates a lesser moment arm between the attachment location $A_L$ and the first gear 150. Here, decreasing the variable assist distance $D_{VA}$ results in the strut force $F_S$ applied by the strut 124 causing a lesser moment $M_R$ at the first gear 150. In short, by increasing or decreasing the variable assist distance $D_{VA}$ (e.g., by rotating the rotation feature 146), the user, or the medical practitioner or assistant, is capable of changing the moment at the first gear 150 and the amount of lift-assistance to the user. Notably, although the strut length L is variable, the amount of strut force $F_S$ applied by the strut 124 is relatively constant and the varying moment $M_R$ at the first gear 150 is dependent upon the variable assist distance $D_{VA}$.

For example, FIG. 13D shows the medical lift-assistance device 112 having a first variable assist distance $D_{VA}$, $D_{VA1}$ between the attachment location $A_L$ and the first rotational axis $A_1$ with the strut 124 having the first strut length $L_1$; FIG. 13C shows the medical lift-assistance device 112 having a second variable assist distance $D_{VA}$, $D_{VA2}$ between the attachment location $A_L$ and the first rotational axis $A_1$ with the strut 124 having the second strut length $L_2$; and the first variable assist distance $D_{VA1}$ is greater than the second variable assist distance $D_{VA2}$. Thus, with the first variable assist distance $D_1$, the first gear 150 receives a greater moment $M_R$ from the strut 124 applying the strut force $F_S$ at the attachment location $A_L$; and, with the second variable assist distance $D_2$, the first gear 150 receives a lesser moment $M_R$ from the strut 124 applying the strut force $F_S$ at the attachment location $A_L$. Thus, by the user rotating the rotation feature 146, and thus, changing the variable assist distance $D_{VA}$, the user, or the medical practitioner or assistant, configures the amount of moment $M_R$ at the first gear 150.

The variable assist mechanism 120 includes a second gear 160, a second axle 162 having a proximal end 161 and a distal end 163, a second rotational axis $A_2$ extending along the second axle 162, and a second rotational direction $D_2$. Here, the second axle 162 is attached to a corresponding one of the brackets 118. In some examples, the second axle 162 is fixed to the corresponding one of the brackets 118 such that the second axle 162 does not rotate with respect to the corresponding one of the brackets. Moreover, the second gear 160 is rotatably attached to the second axle 162 such that the second gear 160 is operable to rotate in the second rotational direction $D_2$ about the second rotational axis $A_2$ (i.e., about the second axle 162). Moreover, the second gear 160 engages the first gear 150. In particular, the second gear 160 has a plurality of teeth 165 extending radially from the second gear 160 that engage the plurality of teeth 155 of the first gear 150. The ratio between a size (i.e., diameter) of the first gear 150 and a size of the second gear 160 may effect a maximum assistive force the medical assistance device 112 provides to the patient. As the size of the first gear 150 and the second gear 160 increases, so may the number of teeth 155, 165. Accordingly, a ratio between the number of teeth 155 of the first gear 150 and the number of teeth 165 of the second gear 160 may effect a maximum assistive force the medical assistance device 112 provides to the patient. Thus, the rotation of the first gear 150 in the first rotational direction $D_1$ causes the second gear 160 to rotate in the second rotational direction $D_2$ about the second rotational axis $A_2$. In some examples, the first rotational direction $D_1$ is opposite the second rotational direction $D_2$. For instance, when the first rotational direction $D_1$ is clockwise, the second rotational direction $D_2$ is counterclockwise. On the other hand, when the first rotational direction $D_1$ is counterclockwise, the second rotational direction $D_2$ is clockwise.

Each medical lift-assistance device also includes a lifting arm 170 having a proximal end 196 and a distal end 198. Here, the proximal end 196 of the lifting arm 170 is attached to a corresponding one of the second gears 160 such that the lifting arm 170 is operable to rotate in the second rotational direction $D_2$ about the second rotational axis $A_2$. Accordingly, the strut 124 applies the strut force $F_S$ at the attachment location $A_L$ of the height-adjustment feature 130 causing a moment $M_R$ to be applied to the first gear 150. Here, the moment $M_R$ causes the first gear 150 and the height adjustment feature 130 to rotate about the first rotational axis $A_1$ in the first rotational direction $D_1$ thereby causing the second gear 160 and the lifting arm 170 to rotate about the second rotational axis $A_2$ in the second rotational direction $D_2$. Simply put, the first gear 150 rotating in the first rotational direction $D_1$ causes the second gear 160 to rotate in the second rotational direction $D_2$.

Notably, the increasing the moment $M_R$ at the first gear 150 increases the force with which the first gear 150 rotates in the first rotational direction $D_1$, and thus, increases the force with which the second gear 160 and lifting arm 170 rotate in the second rotational direction $D_2$. Put another way, as the variable assist distance $D_{VA}$ increases so does the amount of moment $M_R$ at the first gear, and the assistive forces provided to the lifting arm 170 rotating in the second rotational direction $D_2$ are increased. Advantageously, the user, or medical practitioner or assistant, of the medical lift assistance device 112 can configure the amount of assistive force the lifting arms 170 provide for a patient by adjusting the variable assist distance $D_{VA}$.

Further, each medical lift-assistance device 112 includes a pad sub-assembly 220 and a handgrip 240. The pad sub-assembly 220 is attached to the lifting arm 170 distally from the second axle 162. In some examples, the pad sub-assembly 220 is attached to the distal end of the lifting arm 198. The handgrip 240 is attached to the pad-sub assembly 220. The pad sub-assembly 220 is configured to support a thigh of the patient under the knee and the handgrip 240 is configured for the patient to grasp. Accordingly, the patient may exert a pulling force upon the handgrip 240 to rotate the lifting arm 170 and the pad sub-assembly 220 about the second rotational axis $D_2$ such that the leg of the patient supported by the pad sub-assembly 220 is lifted. With the medical procedure facilitation system 110, the user pulls one or both handgrips 240 on each of the pair of medical lift-assistance devices 112*a*, 112*b*. In some examples, the variable assist mechanism 120 provides a mechanical advantage such that a force that is applied to the lifting arm 170 from the variable assist mechanism 120 is greater, for example, twice as large, as the force exerted by the user of the medical lift assistance device 112. The mechanical advantage enables the user to achieve and maintain the desired position of the lifting arm 170 and the pad sub-assembly 220.

In some embodiments, the medical lift-assistance device 112 includes a locking mechanism 202 (FIG. 12) attached to the bracket 118. The locking mechanism 202 includes a third gear 204, a pawl 206, and a handle 212. The third gear 204 includes a plurality of teeth 205 extending radially from the third gear 204. The third gear 204 is rotatably attached to the second axle 162 such that the third gear 204 rotates with the second gear 160 as the second gear 160 rotates. That is, the third gear 204 rotates in the second rotational direction $D_2$ about the second rotational axis $A_2$ along with the second gear 160.

The locking mechanism 202 includes a locked state and an unlocked state. The locked state of the locking mechanism 202 prevents the lifting arm 170 from rotating about the second rotational axis $A_2$. On the other hand, in the unlocked state the locking mechanism 202 allows the lifting arm 170 to rotate about the second rotational axis $A_2$. More specifically, the pawl 206 includes a proximal end 208 and a distal end 210 and the handle 212 is attached to the proximal end 208 of the pawl 206. The distal end 210 of the locking mechanism 202 is capable of engaging the third gear 204. In the locked state, the distal end 210 of the pawl 206 engages the third gear 204; that is, the distal end 210 of the pawl 206 engages the teeth of the third gear 204. The engagement by the distal end 210 with the third gear 204 prevents the second gear 160 from rotating. Since the second gear 160 is prevented from rotating when the locking mechanism 202 is in the locked state, the first gear 150 is also prevented from rotating because the second gear 160 is engaged with the first gear 150. Moreover, the lifting arm 170 is also prevented from rotating when the locking mechanism 202 is in the locked state because the lifting arm 170 is attached to the second gear 160.

In the unlocked state, the distal end 210 of the pawl 206 is disengaged from the third gear 204 such that the third gear 204, the second gear 160, and the lifting arm 170 are free to rotate about the second rotational axis $A_2$. In short, the locking mechanism 202 is configured to prevent rotation of the first gear 150 and the second gear 160 in the locked state such that the lifting arm 170 and the pad sub-assembly 220 are locked in place. Conversely, the locking mechanism 202 is configured to allow rotation of the first gear 150 and the second gear 160 in the unlocked state such that the lifting arm 170 and the pad sub-assembly 220 may rotate about the second rotational axis $A_2$ to raise or lower the pad sub-assembly 220 and, thus, the legs of the patient.

Figure 14A:
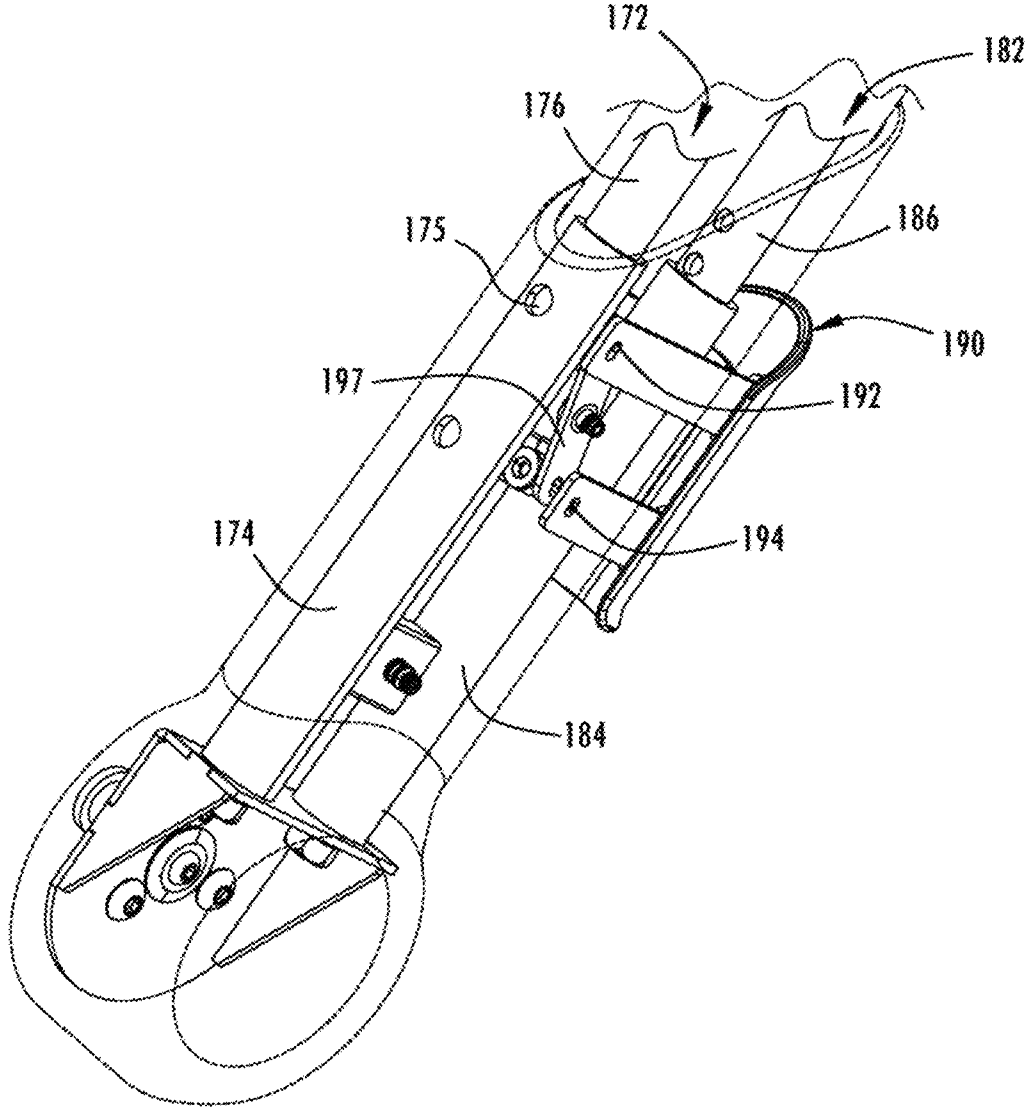
FIG. 14A depicts a perspective view of a lifting arm of one of the medical lift-assistance devices, according to the second embodiment of the present disclosure.
Figure 14B:
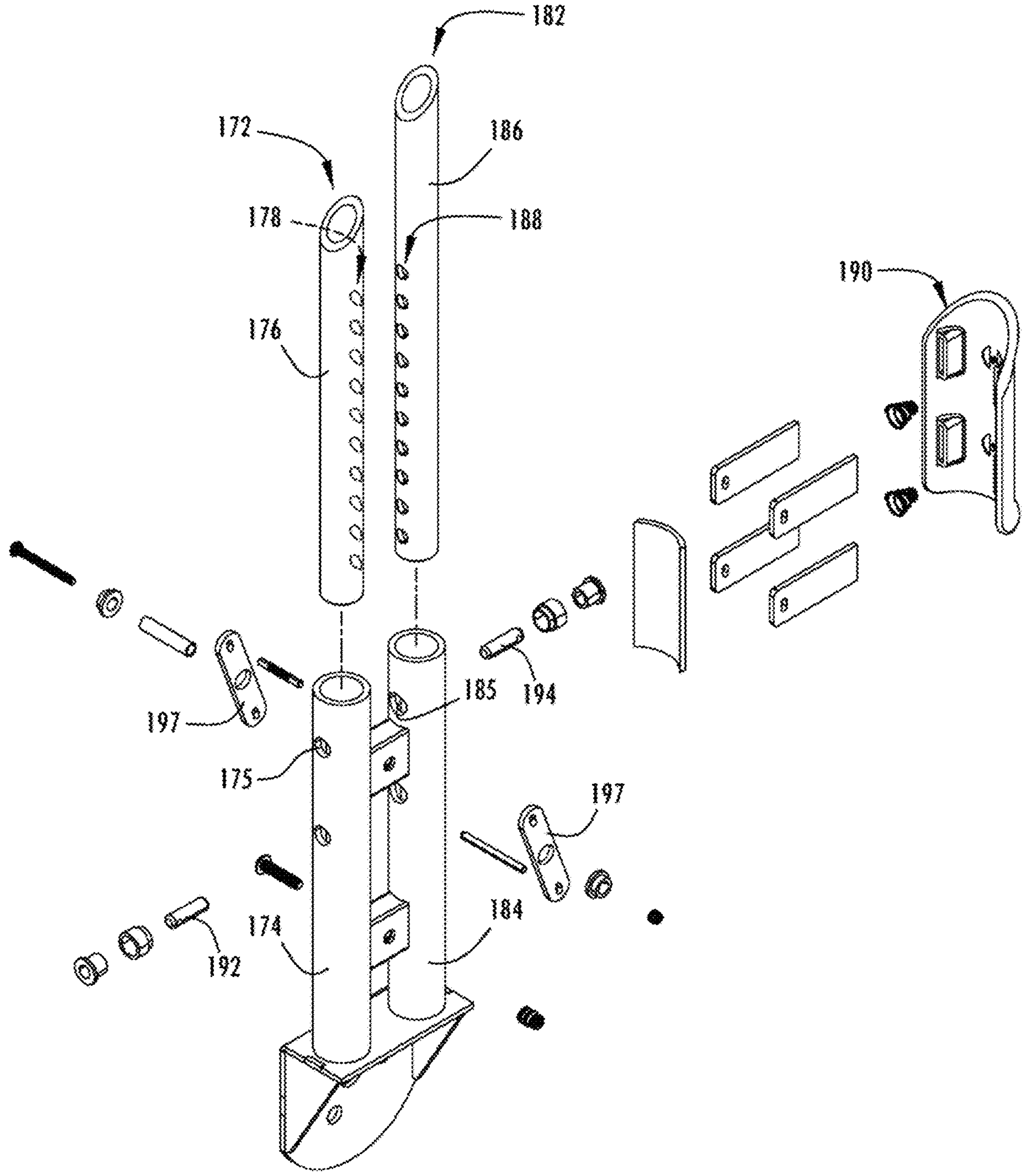
FIG. 14B depicts an exploded view of the lifting arm of one of the medical lift-assistance devices, according to the second embodiment of the present disclosure.
Figure 14C:
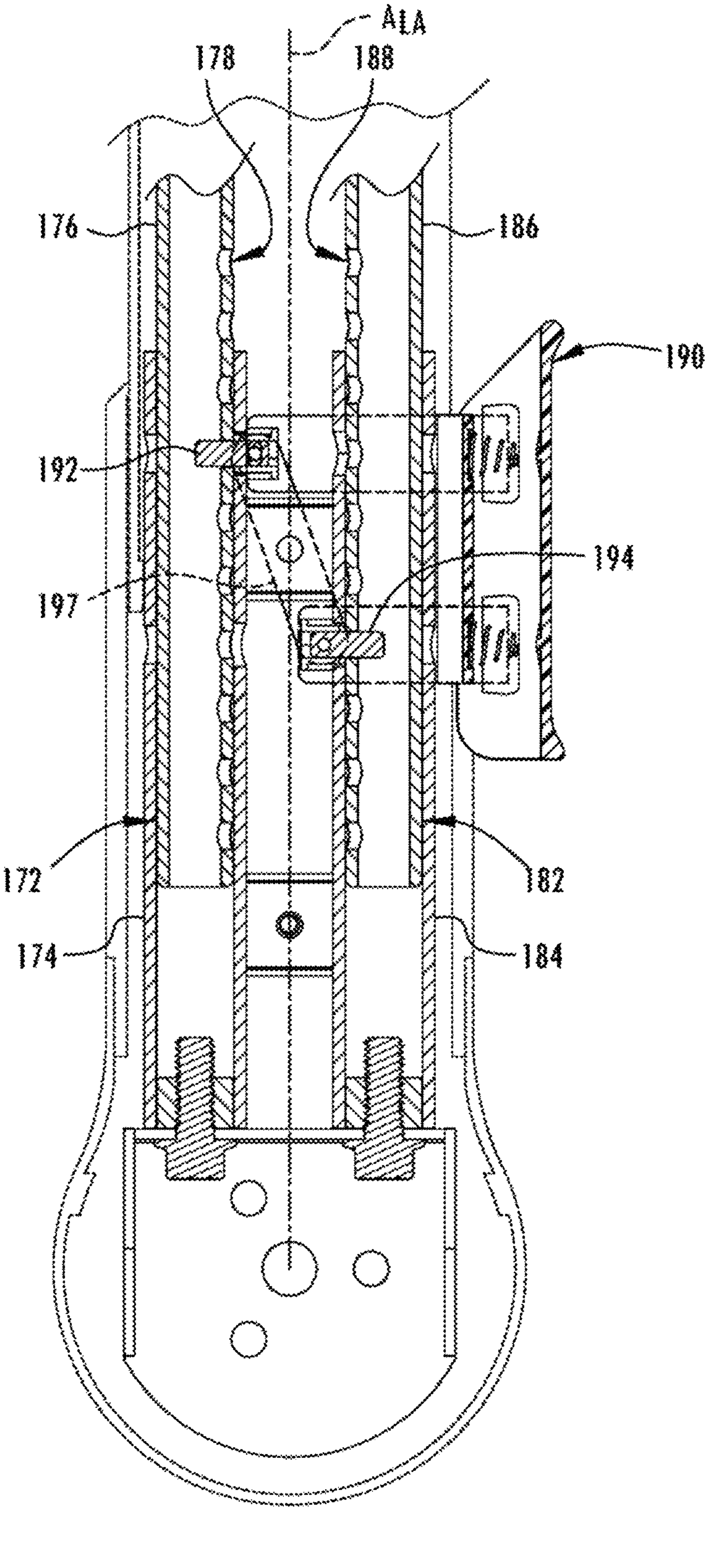
FIG. 14C depicts a cross-sectional view of the lifting arm of one of the medical lift-assistance devices, according to the second embodiment of the present disclosure.

Referring now to FIGS. 14A-14C, in some embodiments, the lifting arm 170 of the medical lift assistance device 112 includes a lifting arm axis $A_L$A (FIG. 14C) that extends along the midline of the lifting arm 170 from the proximal end 196 of the lifting arm 170 to the distal end 198 of the lifting arm 170 along axis $A_L$. In some examples, the lifting arm 170 is a telescoping arm operable to extend or shorten a portion of the lifting arm 170 to accommodate patients of various sizes, e.g., heights. To that end, the lifting arm 170 may include a first pair of tubes 172, a second pair of tubes 182, and a spring-biased handle 190. Here, the first pair of tubes 172 and the second pair of tubes 182 may be disposed between the proximal end 196 and the distal end 198 of the lifting arm 170.

The first pair of tubes 172 include a first outer tube 174 having a first diameter and a first inner tube 176 having a second diameter. Here, the second diameter is smaller than the first diameter whereby the first inner tube 176 is nested and slidable within the first outer tube 174. The first inner tube 176 may include a series of engagement holes 178 and the outer tube 174 has at least one outer hole 175. Similarly, the second pair of tubes 182 includes a second outer tube 184 having a third diameter and a second inner tube 186 having a fourth diameter. Here, the third diameter is smaller than the fourth diameter whereby the second inner tube 186 is nested and slidable within the second outer tube 184. The second inner tube 186 may include a series of engagement holes 188 and the second outer tube 184 has at least one outer hole 185. The lifting arm 170 also includes the spring-biased handle 190 and a pair of locking features 192, 194 wherein the spring-biased handle 190 is attached to the pair of locking features 192, 194. In particular, the spring-biased handle 190 may include a rotation member 197 attached to the pair of locking features 192, 194.

The pair of locking features 192, 194 are operable between a locked position and an unlocked position. In particular, in the locked position, the first locking feature 192 engages (e.g., extends through) the at least one outer hole 175 of the first outer tube 174 and one of the first series of engagement holes 178 and the second locking feature 194 engages (e.g., extends through) the at least one outer hole 185 of the second outer tube 184 and one of the second series of engagement holes 188. The engagement by the locking features 192, 194 with the first series of engagement holes 178 and the second series of engagement holes 188, respectively, prevents the first inner tube 176 and the second inner tube 186 from translating along the lifting arm axis $A_{LA}$ Stated differently, in the locked position, the pair of locking features 192, 194 secure the lifting arm 170 such that, by securing the first inner tube 176 and the second inner tube 186 in a fixed position within the first outer tube 178 and the second outer tube 188, the lifting arm 170 cannot be extended or shortened. The spring-biased handle 190 may bias the pair of locking feature 192, 194 in the locked position.

In the unlocked position, the pair of locking features 192, 194 are disengaged from the first series of engagement holes 178, the at least one outer hole 175, the at least one outer hole 185, and the second series of engagement holes 188.

For example, the user may exert a force upon the spring-biased handle 190 to disengage the pair of locking features 192, 194 from the first series of engagement holes 178, the at least one outer hole 175, the at least one outer hole 185, and the second series of engagement holes 188 such that the user extends or retracts the length of the lifting arm 170 by translating the first inner tube 176 and the second inner tube 186 along the lifting arm axis $A_{LA}$. The user releases the spring-biased handle 190, the spring-force in the spring-biased handle 190 returns the locking features 192, 194 to engage with the first series of engagement holes 178, the at least one outer hole 175, the at least one outer hole 185, and the second series of engagement holes 188 to secure the lifting arm 170 in place.

Figure 15A:
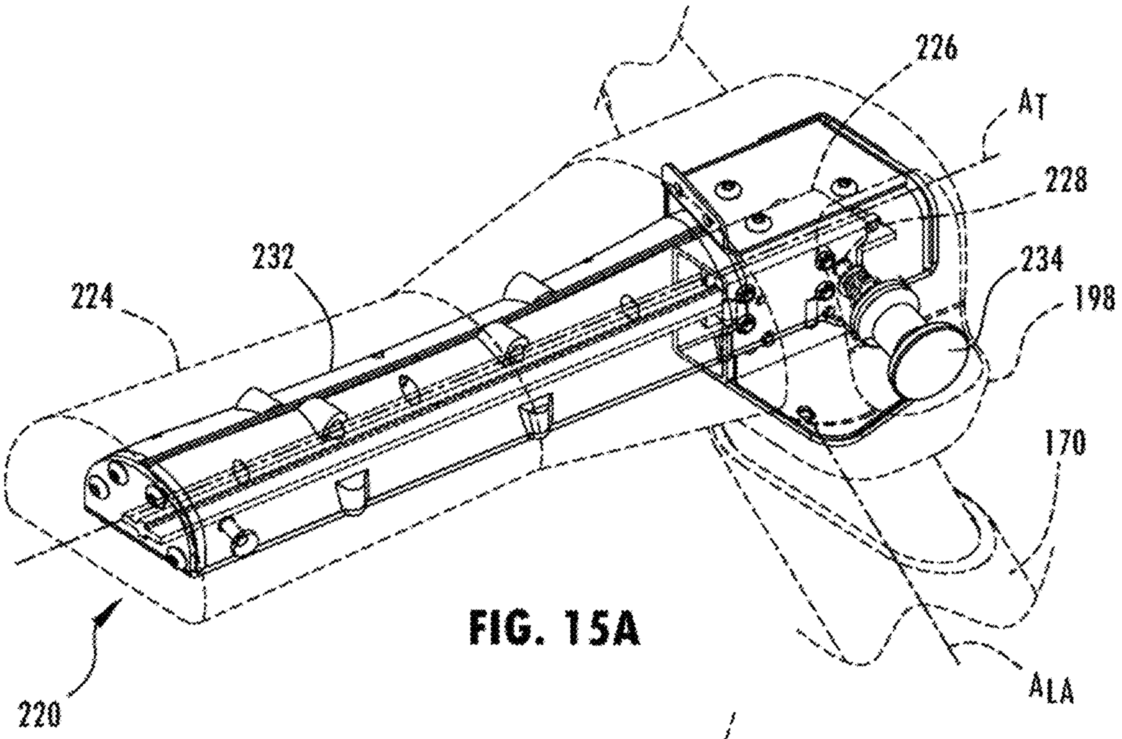
FIG. 15A depicts a perspective view of a pad-sub assembly of one of the medical lift-assistance devices in a first position, according to the second embodiment of the present disclosure.
Figure 15B:
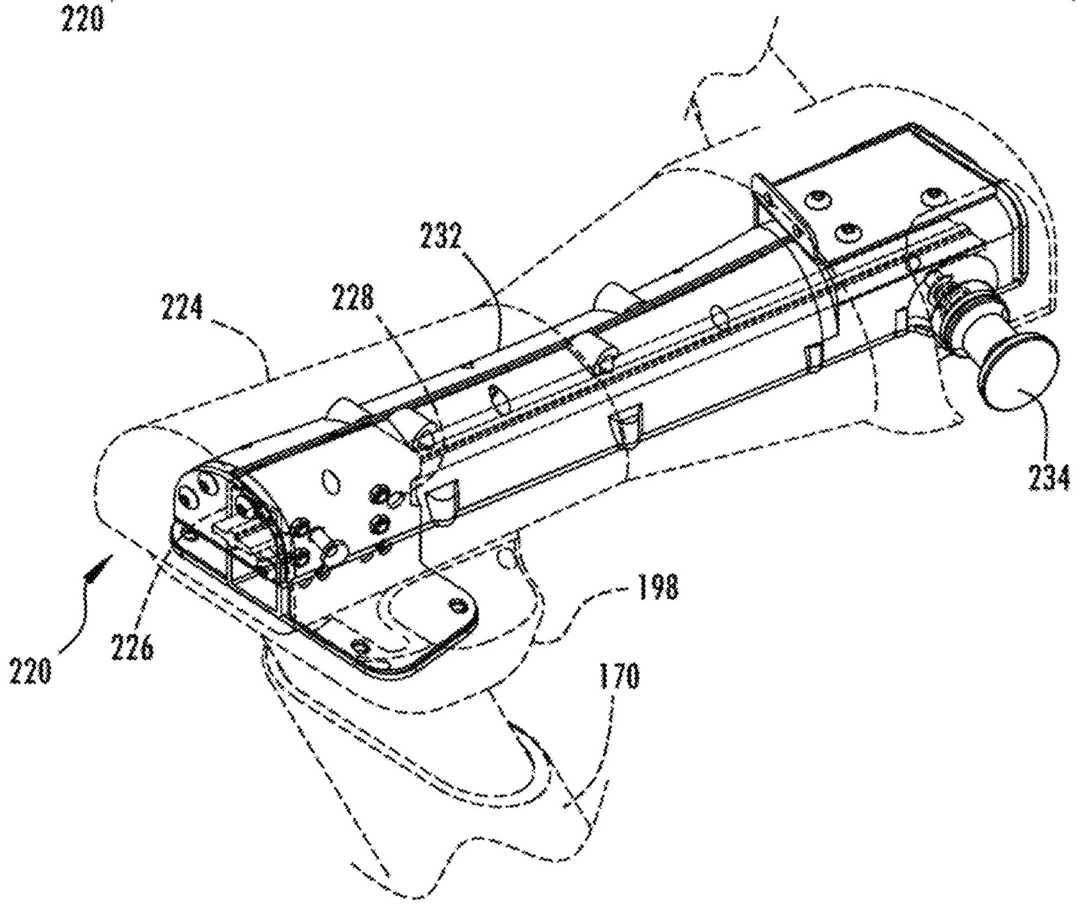
FIG. 15B depicts a perspective view of the pad-sub assembly of one of the medical lift-assistance devices in a second position, according to the second embodiment of the present disclosure.
Figure 15C:
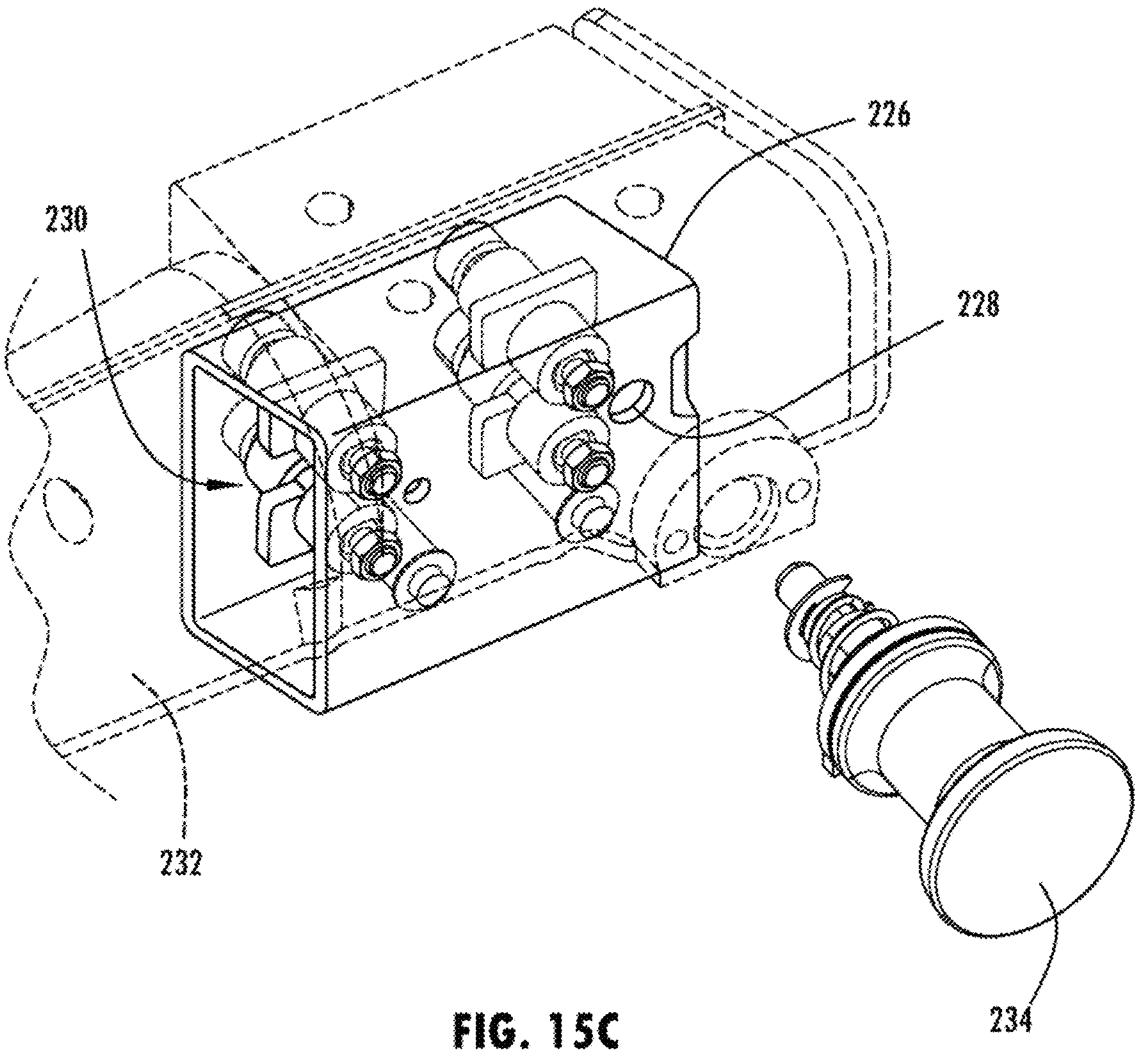
FIG. 15C depicts a perspective view of a translation mechanism and a spring-biased locking pin of the pad-sub assembly of one of the medical lift-assistance devices, according to the second embodiment of the present disclosure.

Referring now to FIGS. 15A-15C, the pad sub-assembly 220 includes a translation axis $A_T$ that extends along a midline of the pad sub-assembly 220. The translation axis $A_T$ may be orthogonal to the lifting arm axis $A_{LA}$. In some examples, the pad sub-assembly includes a frame 232, a pad 224, and a translation mechanism 226 having a locking hole 228 and a series of bearings 230. The pad 224 may be attached to the frame 232. The translation mechanism 226 interfaces the frame 232 via the series of bearings 230 thereby allowing the pad sub-assembly 220 to translate in either direction along the translation axis $A_T$. In some embodiments, the pad sub-assembly includes a spring-biased locking pin 234 having a locked position and an unlocked position. In the locked position the spring-biased locking pin 234 engages the locking hole 228 of the translation mechanism 226 such that the pad sub-assembly 220 is secured to the translation mechanism 226 and is incapable of translating along the translation axis $A_T$. In the unlocked position, the spring-biased locking pin 234 is disengaged from the locking hole 228 whereby the pad sub-assembly 220 is capable of translating along the translation axis $A_T$. The spring-biased locking pin 234 may bias the spring-biased locking pin 234 to be in the locked position.

Figure 8A:
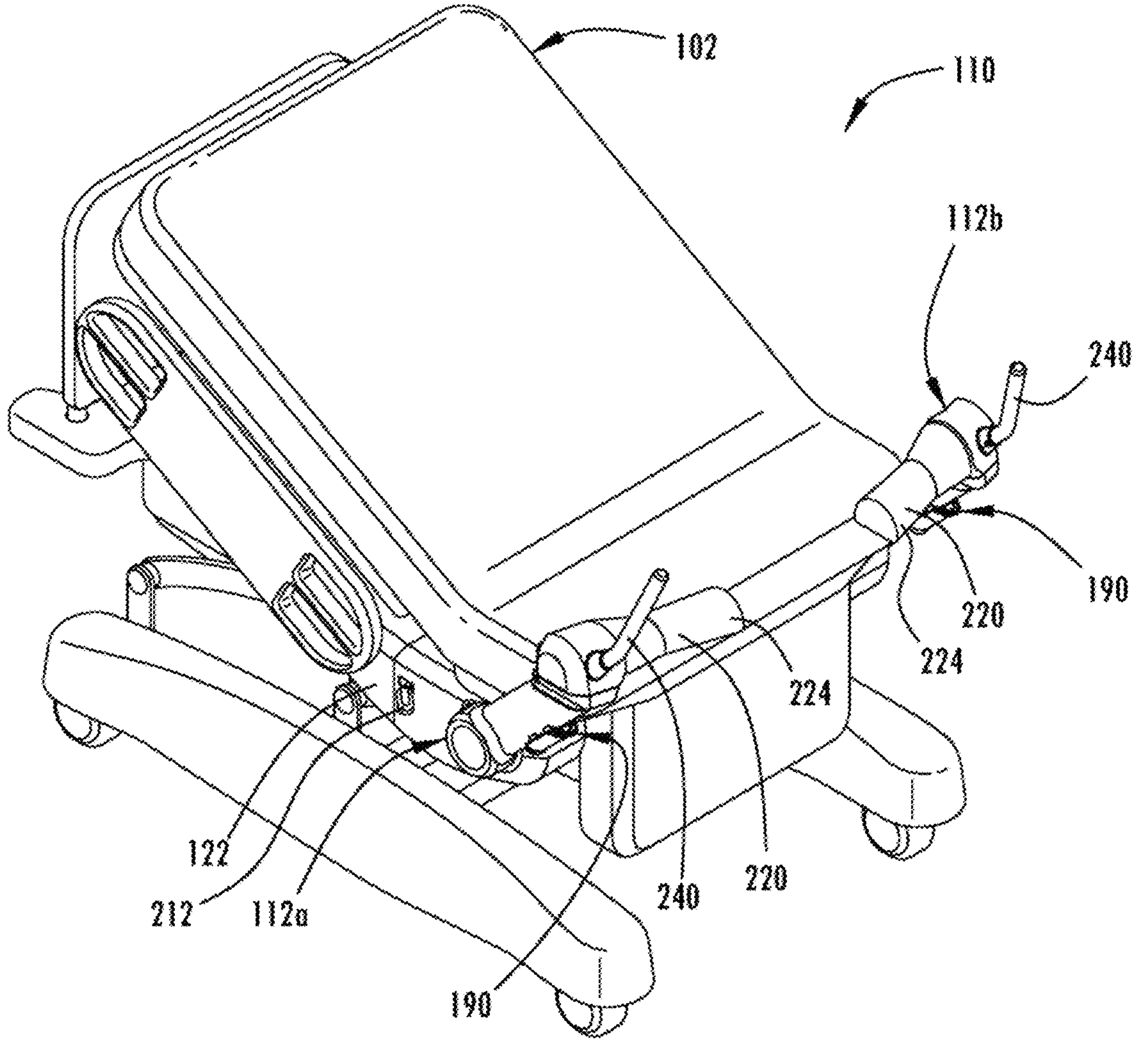
FIG. 8A depicts a top front perspective view of a medical procedure facilitation system in an in-use position, according to a second embodiment of the present disclosure.
Figure 8B:
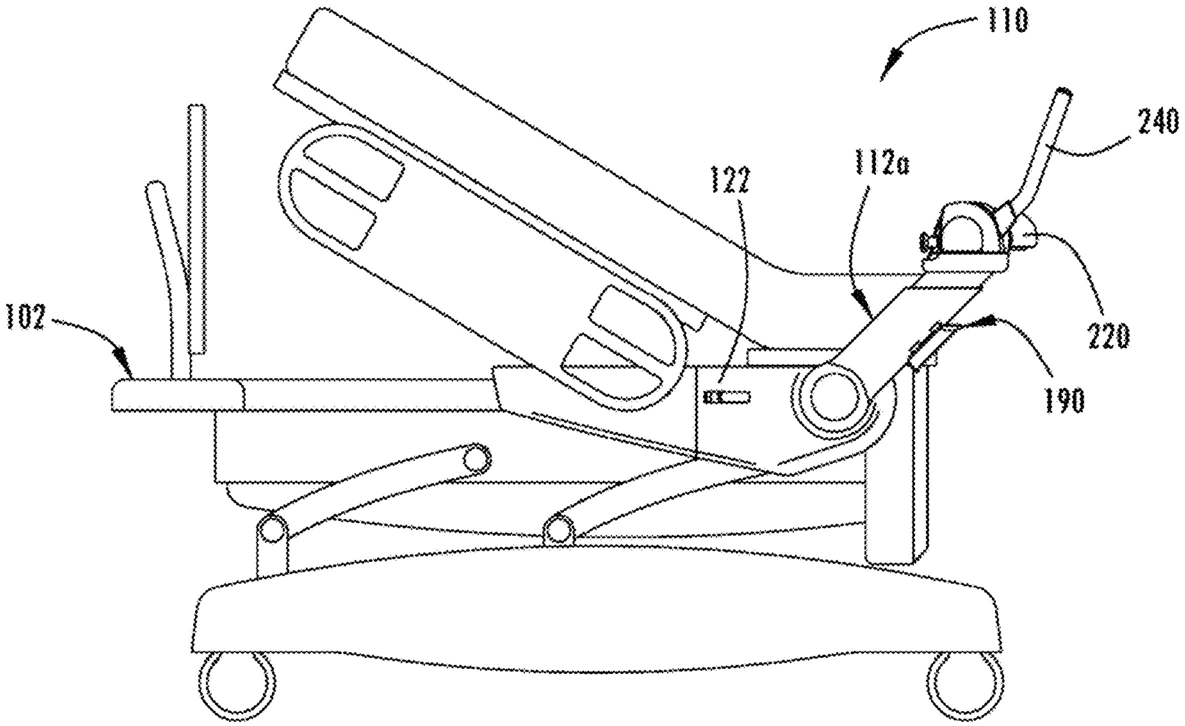
FIG. 8B depicts a left-side view of the medical procedure facilitation system in the in-use position, according to the second embodiment of the present disclosure.
Figure 8C:
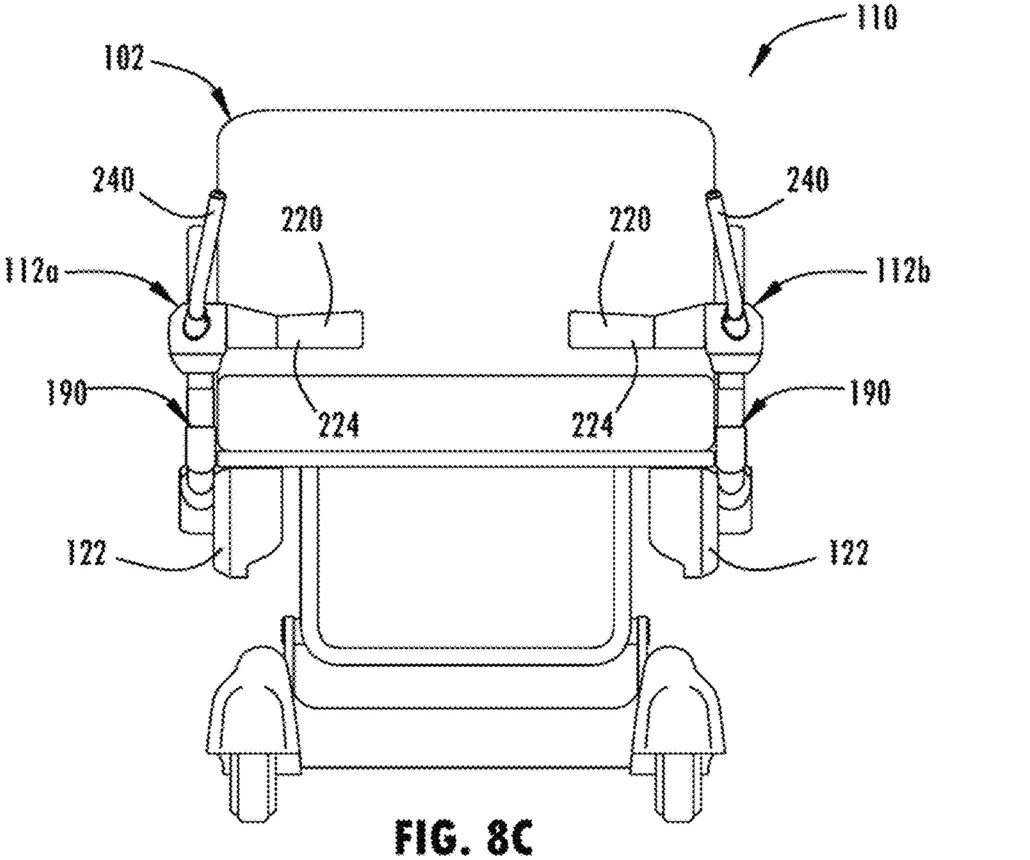
FIG. 8C depicts a front view of the medical procedure facilitation system in the in-use position, according to the second embodiment of the present disclosure.
Figure 9:
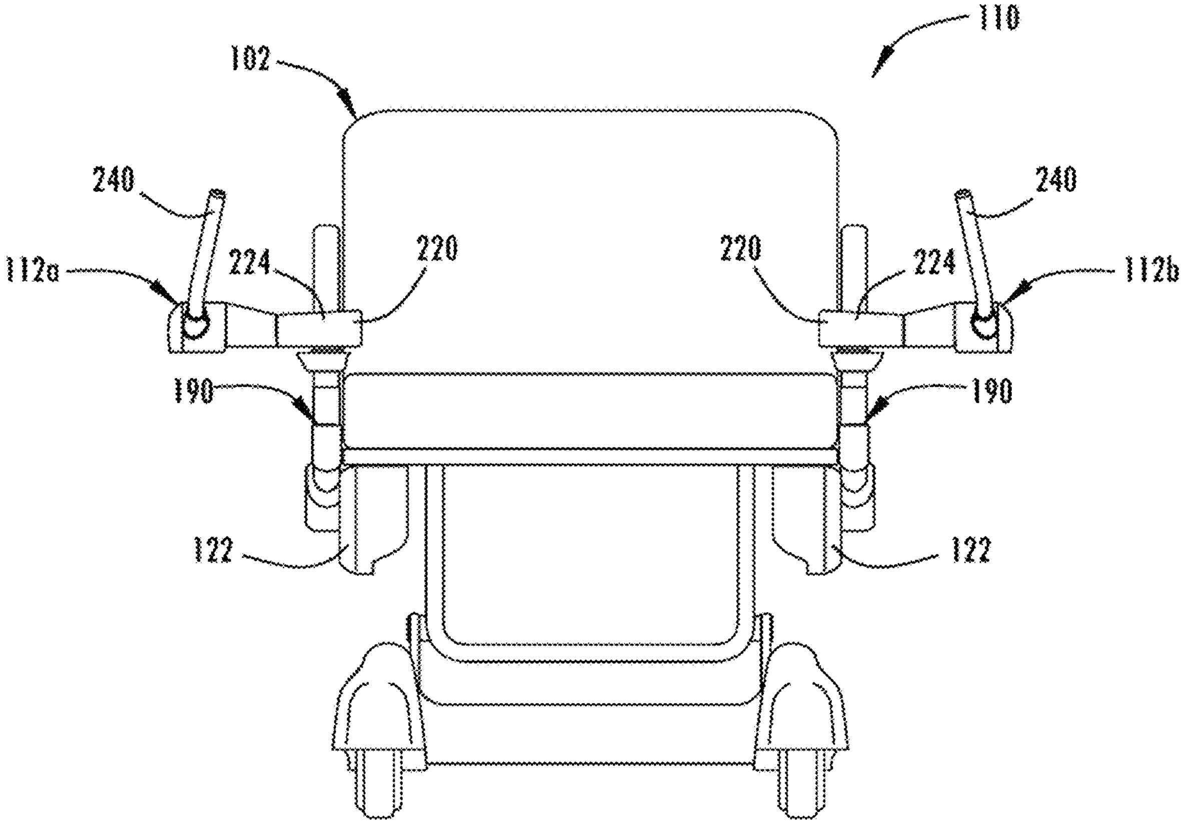
FIG. 9 depicts a front view of the medical procedure facilitation system with pad sub-assemblies translated outward, according to the second embodiment of the present disclosure.
Figure 10A:
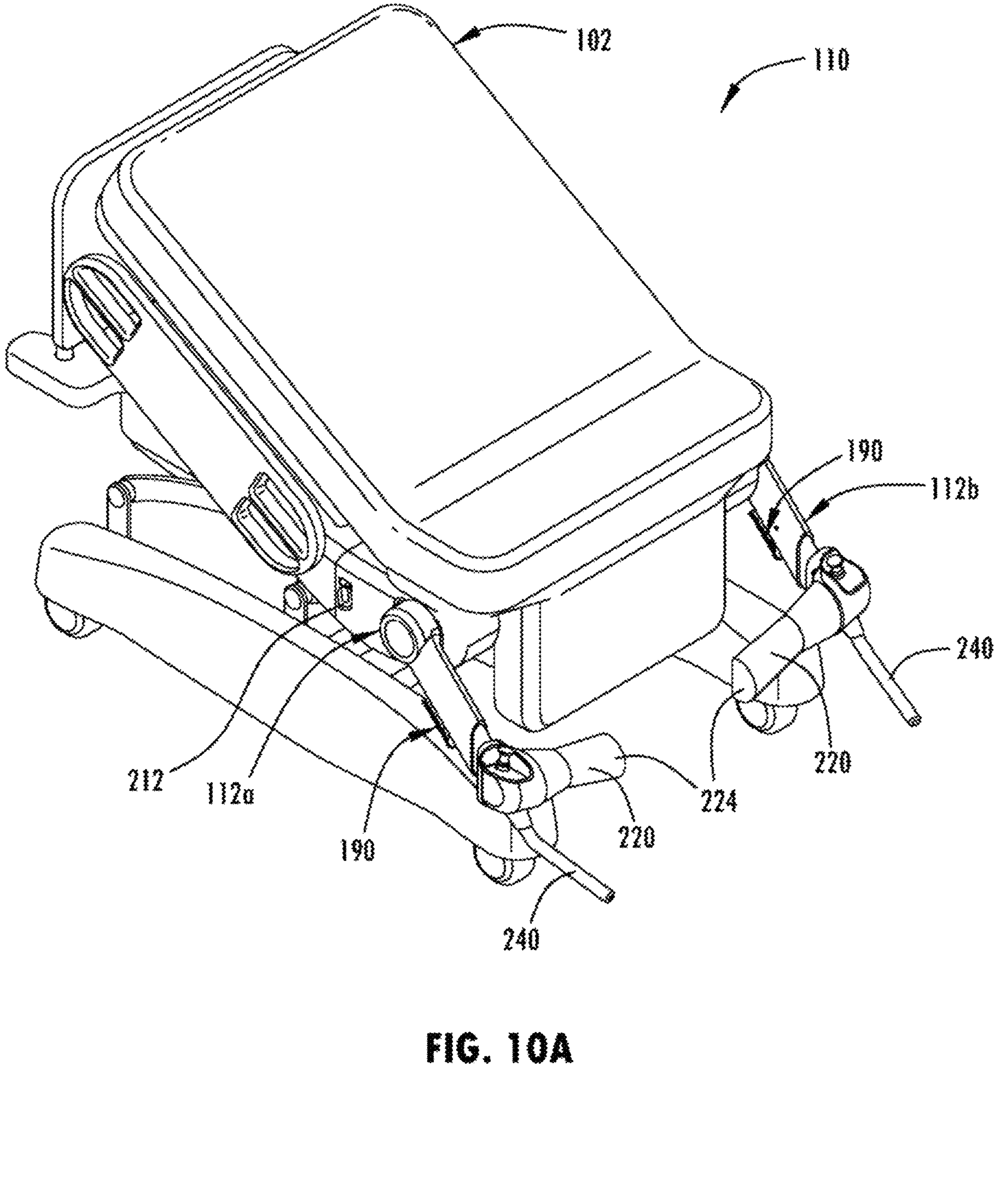
FIG. 10A depicts a top front perspective view of the medical procedure facilitation system in a storage-position, according to the second embodiment of the present disclosure.
Figure 10B:
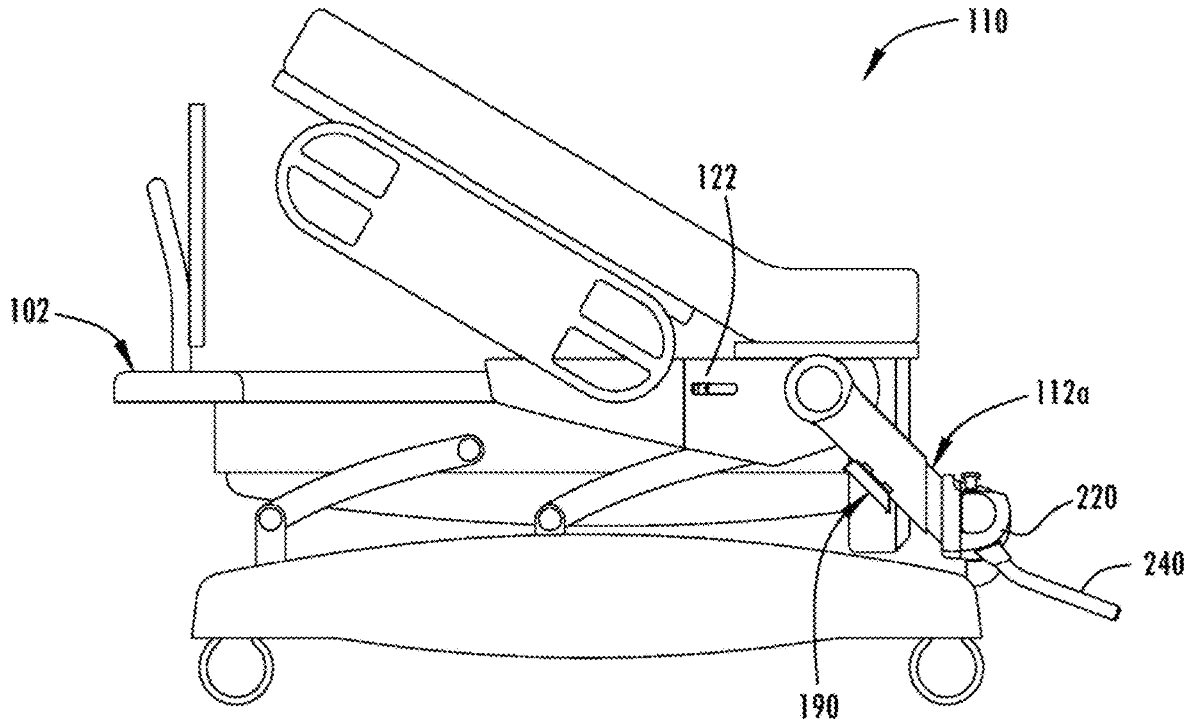
FIG. 10B depicts a left-side view of the medical procedure facilitation system in the storage-position, according to the second embodiment of the present disclosure.
Figure 10C:
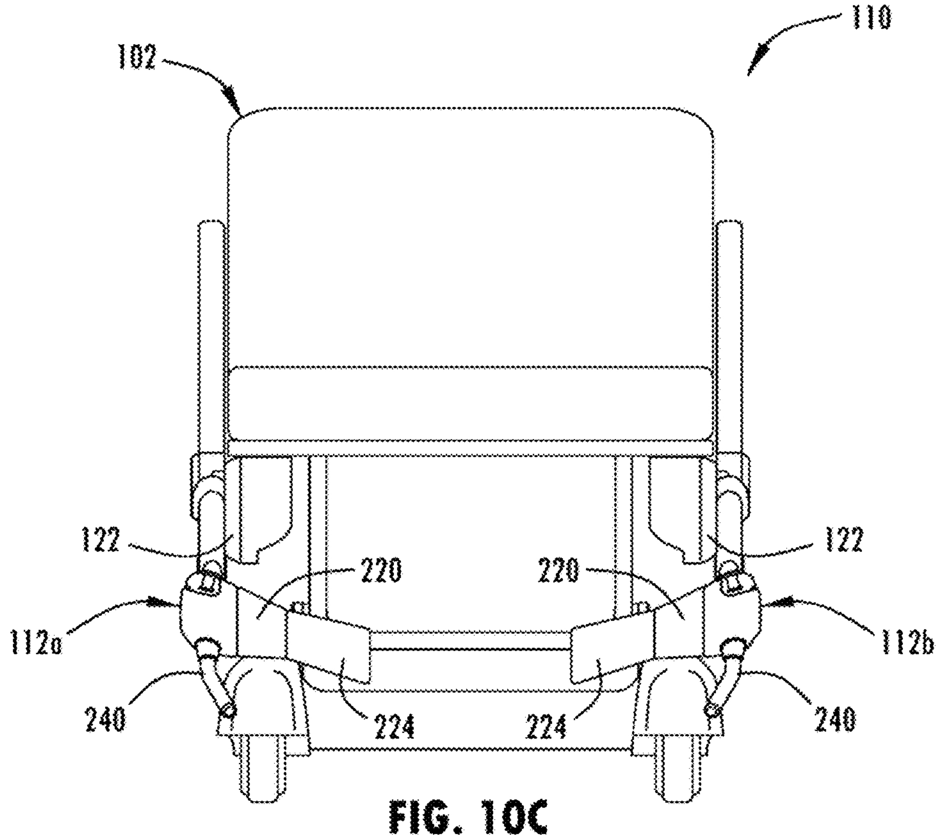
FIG. 10C depicts a front view of the medical procedure facilitation system in the storage-position, according to the second embodiment of the present disclosure.
Figure 11A:
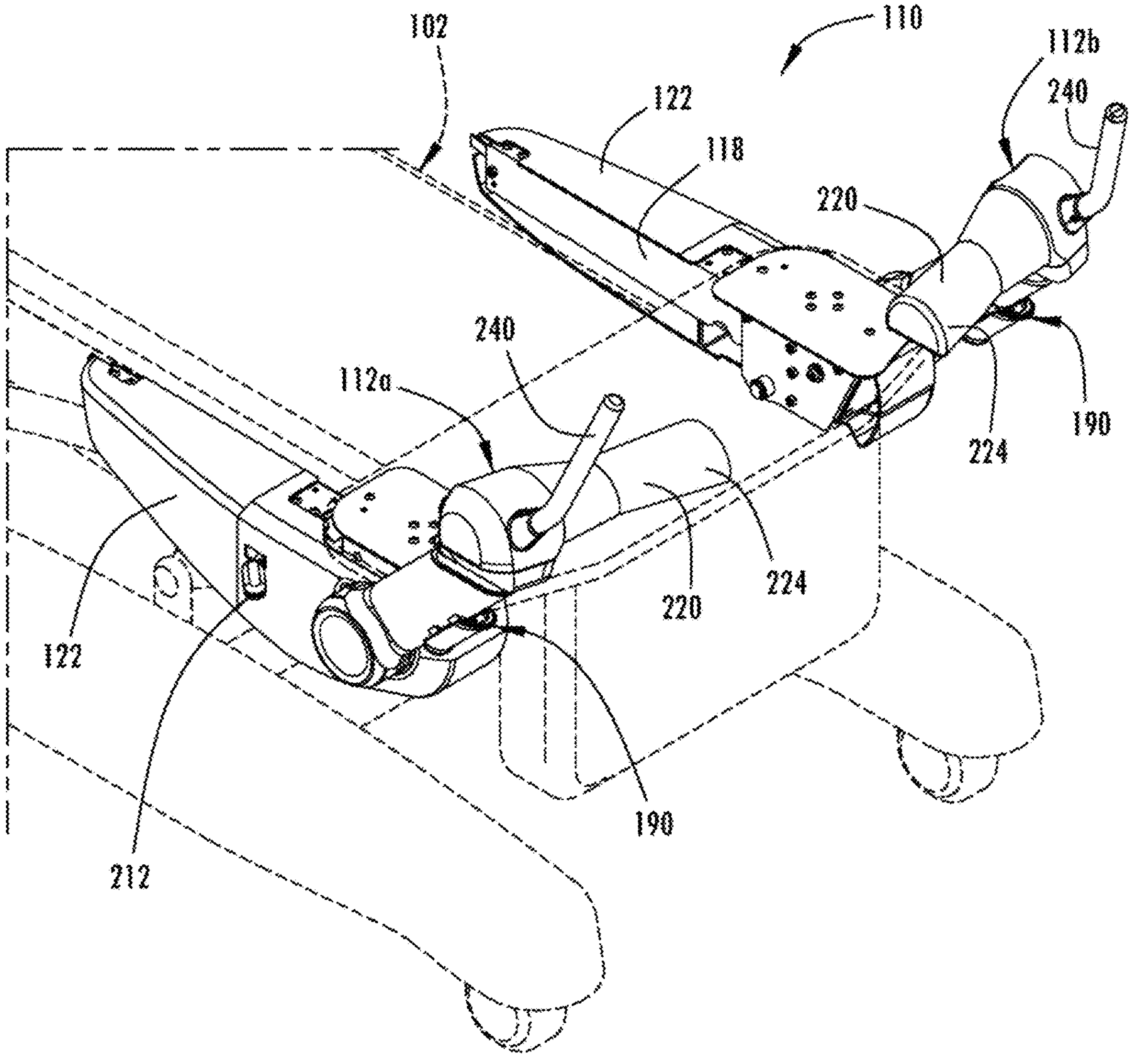
FIG. 11A depicts a top front perspective view of the medical procedure facilitation system in the in-use position, according to the second embodiment of the present disclosure.
Figure 11B:
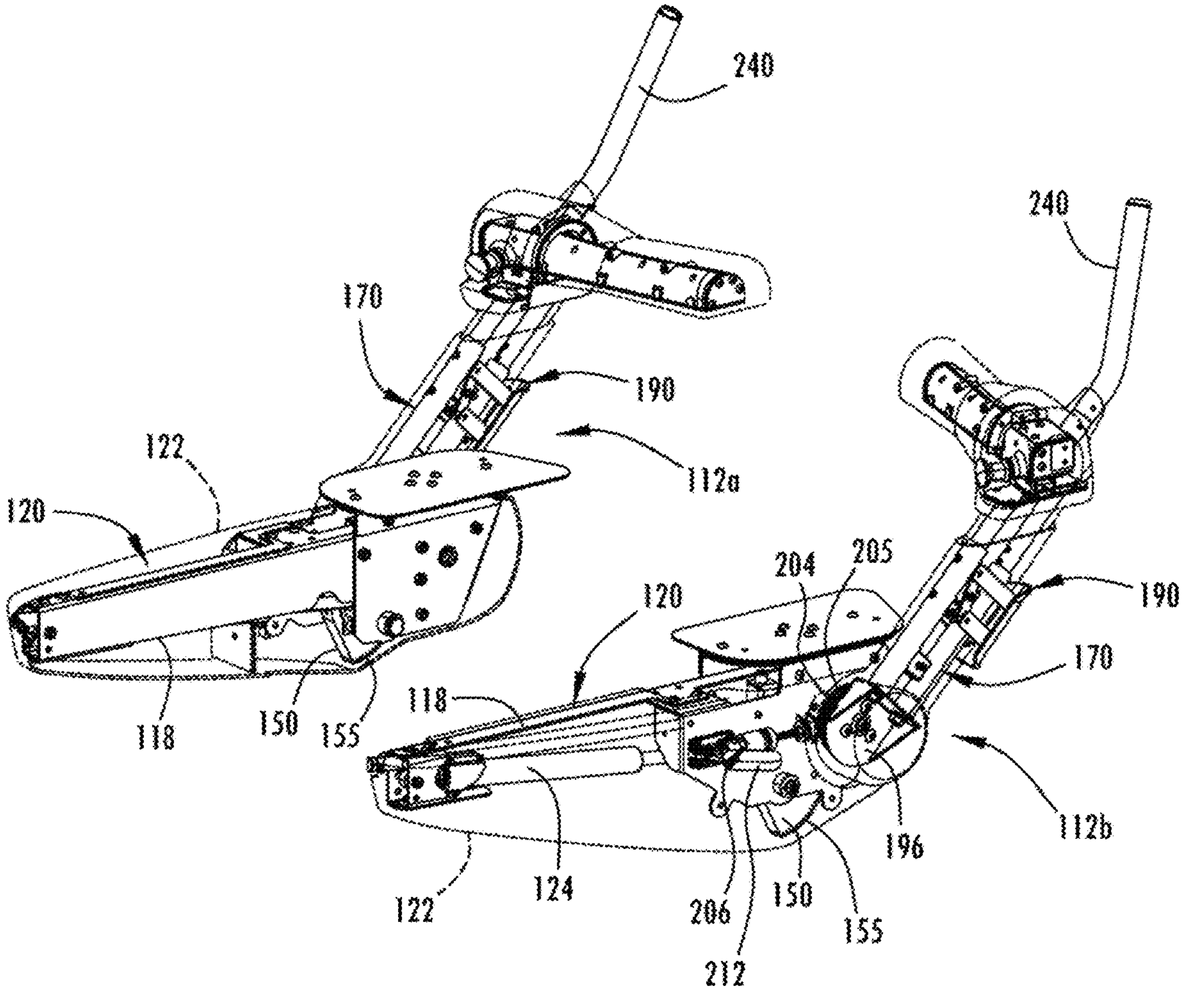
FIG. 11B depicts a top rear perspective view of a pair of medical lift-assistance devices of the medical procedure facilitation system, according to the second embodiment of the present disclosure.
Figure 12:
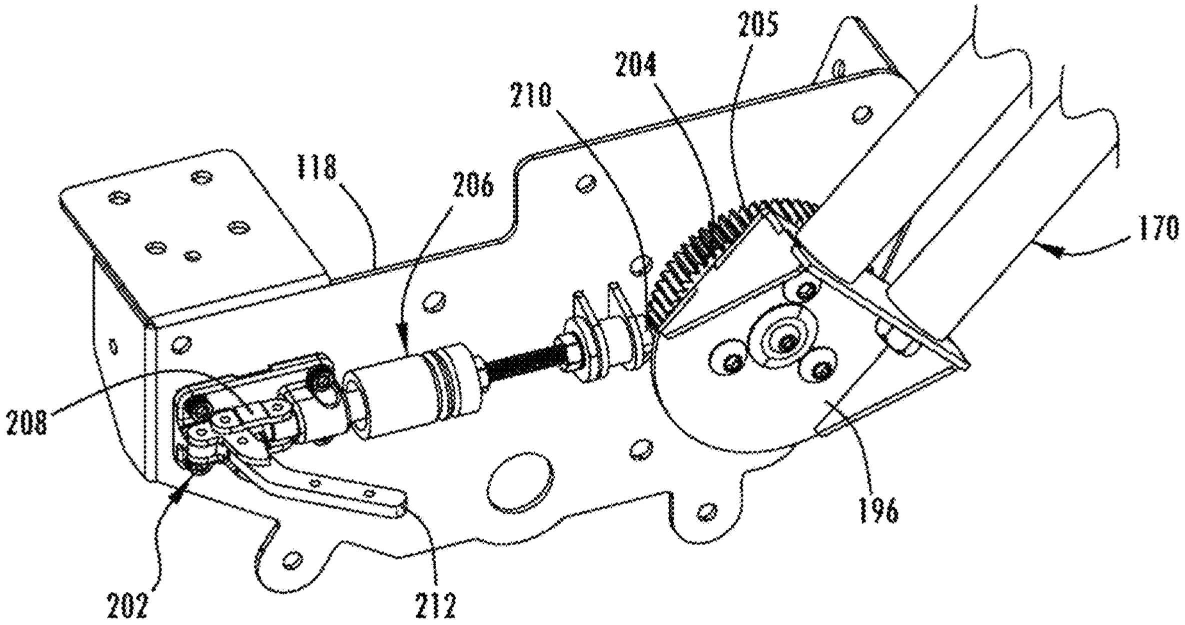
FIG. 12 depicts a top rear perspective view of a locking mechanism of one of the medical lift-assistance devices, according to the second embodiment of the present disclosure.

FIGS. 8A-8C illustrate an in-use position of the medical lift-assistance device 112*a*, 112*b* such that the pad sub-assemblies 220 overhang the operating platform 102. More specifically, in the in-use position, the pad sub-assemblies 220 are directly above the operating platform 102 such that the medical lift-assistance device 112 cannot be rotated downwardly to a position beneath the operating platform 102, i.e., in the in-use position the pad sub-assemblies 220 would make contact with the operating platform 102 if the user attempts to rotate the lifting arm 170 below the operating platform 102. However, as shown in FIG. 9, the pad sub-assemblies 220 can be translated outwardly such that the pad sub-assemblies 220 do not overhang the operating platform 102. Therefore, when it is desired to stow the medical assistance device 112*a*, 112*b*, the pad sub-assemblies 220 can be translated outwardly such that the pad sub-assemblies 220 do not overhang the operating platform 102 and then the lifting arm 170 of the medical lift-assistance devices 112*a*, 112*b* can be rotated downwardly beneath the operating platform. After the lifting arm 170 of the medical lift-assistance devices 112*a*, 112*b* have been rotated downwardly beneath the operating platform 102 (FIG. 10A), the pad sub-assemblies 220 can be translated inwardly again as shown in FIG. 10C.

A number of implementations have been described. Nevertheless, it will be understood that various modifications may be made without departing from the spirit and scope of the disclosure. Accordingly, other implementations are within the scope of the following claims.

What is claimed is:

1. A medical lift-assistance device, comprising:
a bracket,
a variable assist mechanism having
a strut including a proximal end and a distal end, the proximal end attached to the bracket,
a height-adjustment feature including a lower end, an upper end, and an attachment location between the lower end and the upper end, wherein the distal end of the strut is attached to the height-adjustment feature at the attachment location,
a first gear, a first axle, a first rotational axis extending along the first axle, and a first rotational direction, wherein the first axle is attached to the bracket, wherein the first gear is rotatably attached to the first axle and the lower end of the height-adjustment feature is attached to the first gear, and
a second gear, a second axle, a second rotational axis extending along the second axle, and a second rotational direction, wherein the second axle is attached to the bracket, wherein the second gear is rotatably attached to the second axle and engages the first gear,
a lifting arm including a proximal end and a distal end, wherein the proximal end of the lifting arm is attached to the second gear; and
a pad sub-assembly attached to the lifting arm distal from the second axle,
wherein the strut applies a strut force to the height-adjustment feature at the attachment location capable of causing the first gear to rotate in the first rotational direction, wherein the rotation of the first gear in the first rotational direction causes the second gear and the lifting arm to rotate in the second rotational direction.

2. The medical lift-assistance device of claim 1, wherein the first rotational direction is opposite the second rotational direction.

3. The medical lift-assistance device of claim 1, further including a locking mechanism, wherein the locking mechanism includes a third gear, a pawl, and a handle, wherein the locking mechanism is attached to the bracket, wherein the third gear is rotatably attached to the second axle and attached to the second gear such that the third gear rotates with the second gear, wherein the pawl has a proximal end and a distal end, the handle is attached to the proximal end of the pawl, and the distal end of the pawl is capable of engaging the third gear such that the second gear, the third gear, and the lifting arm are prevented from rotating in the second rotational direction.

4. The medical lift-assistance device of claim 1, wherein the height-adjustment feature is defined by
a threaded shaft and a third rotational axis, wherein the threaded shaft extends along the third rotational axis from the lower end to the upper end of the height-adjustment feature,
a ball nut rotatably attached to the threaded shaft at the attachment location, wherein the distal end of the strut is fixed to the ball nut at the attachment location, and
a rotation feature attached to the threaded shaft,
wherein rotating the rotation feature and the threaded shaft causes the ball nut and the attachment location to translate along the threaded shaft.

5. The medical lift-assistance device of claim 4, wherein the variable assist mechanism further includes a variable assist distance between the attachment location of the height-adjustment feature and the first rotational axis, wherein translating the ball nut and the attachment location along the threaded shaft causes the variable assist distance to change.

6. The medical lift-assistance device of claim 5, wherein the variable assist mechanism further comprises a first variable assist distance and a second variable assist distance, wherein the strut includes a strut length from the proximal end of the strut to the distal end of the strut, wherein the strut length can vary between a first strut length and a second strut length, wherein the first gear receives a first moment from the strut applying the strut force to the height-adjustment feature when the strut has the first strut length and the variable assist mechanism has the first variable assist distance, wherein the first gear receives a second moment from the strut applying the strut force to the height-adjustment feature when the strut has the second strut length and the variable assist mechanism has the second variable assist distance.

7. The medical lift-assistance device of claim 6, wherein, when the first variable assist distance is greater than the second variable assist distance, the first moment is greater than the second moment.

8. The medical lift-assistance device of claim 4, wherein the variable assist mechanism further comprises an electric motor attached to the rotation feature.

9. The medical lift-assistance device of claim 4, wherein the rotation feature is attached to the threaded shaft at the lower end of the height-adjustment feature.

10. The medical lift-assistance device of claim 4, wherein the rotation feature is integral with the threaded shaft.

11. The medical lift-assistance device of claim 1, wherein the lifting arm has a first pair of tubes including a first outer tube having a first diameter and a first inner tube having a second diameter smaller than the first diameter, the first inner tube having a first series of engagement holes, a second pair of tubes including a second outer tube having a third diameter and a second inner tube having a fourth diameter smaller than the third diameter, the second inner tube having a second series of engagement holes, and a spring-biased handle and a pair of locking features, wherein the spring-biased handle is attached to the pair of locking features.

12. The medical lift-assistance device of claim 11, wherein the pair of locking features are operable between a locked position and an unlocked position, wherein the pair of locking features engage a respective one of the first series of engagement holes and a respective one of the second series of engagement holes in the locked position.

13. The medical lift-assistance device of claim 1, wherein the lifting arm further includes a lifting arm axis that extends from the proximal end to the distal end of the lifting arm, wherein the pad sub-assembly includes a translation axis that extends along a midline of the pad sub-assembly, wherein the translation axis is orthogonal to the lifting arm axis.

14. The medical lift-assistance device of claim 13, wherein the pad sub-assembly further includes a translation mechanism having a locking hole, wherein the translation mechanism is attached to the distal end of the lifting arm, a spring-biased locking pin having a locked position and an unlocked position, wherein the spring-biased locking pin engages the locking hole in the locked position such that the pad sub-assembly is incapable of translating along the translation axis, wherein the spring-biased locking pin disengages the locking hole in the unlocked position such that the pad sub-assembly is capable of translating along the translation axis.

15. A medical procedure facilitation system, comprising:

a pair of brackets each attachable to an operating platform, a pair of variable assist mechanisms each having a strut including a proximal end and a distal end, the proximal end attached to a corresponding one of the brackets, a height-adjustment feature including a lower end, an upper end, and an attachment location between the lower end and the upper end, wherein the distal end of the strut is attached to the height-adjustment feature at the attachment location, a first gear, a first axle, a first rotational axis extending along the first axle, and a first rotational direction, wherein the first axle is attached to a corresponding one of the brackets, wherein the first gear is rotatably attached to the first axle and the lower end of the height-adjustment feature is attached to the first gear, and a second gear, a second axle, and a second rotational axis extending along the second axle, and a second rotational direction, wherein the second axle is attached to a corresponding one of the brackets, wherein the second gear is rotatably attached to the second axle and engages the first gear, a pair of lifting arms each including a proximal end and a distal end, wherein the proximal end is attached to a corresponding one of the second gears, a pair of pad sub-assemblies each attached to a corresponding one of the lifting arms distal from the second axle, wherein each strut applies a respective strut force to a corresponding one of the height-adjustment features at the attachment location capable of causing the first gear to rotate in the first rotational direction, wherein the rotation of the first gear in the first rotational direction causes the second gear and the lifting arm to rotate in the second rotational direction.

16. The medical procedure facilitation system of claim 15, wherein the first rotational direction is opposite the second rotational direction.

17. The medical procedure facilitation system of claim 15, further including a pair of locking mechanisms, wherein each locking mechanism includes a third gear, a pawl, and a handle, wherein each locking mechanism is attached to a corresponding one of the brackets, wherein the third gear is rotatably attached to a corresponding one of the second axles and attached to a corresponding one of the second gears such that the third gear rotates with the corresponding one of the second gears, wherein the pawl has a proximal end and a distal end, the handle is attached to the proximal end of the pawl, and the distal end of the pawl is capable of engaging the third gear such that the corresponding one of the second gears, the third gear, and a corresponding one of the lifting arms are prevented from rotating in the second rotational direction.

18. The medical procedure facilitation system of claim 15, wherein each height-adjustment feature is defined by a threaded shaft and a third rotational axis, wherein the threaded shaft extends along the third rotational axis from the lower end to the upper end of the height-adjustment feature, a ball nut rotatably attached to the threaded shaft at the attachment location, wherein the distal end of a corresponding one of the struts is attached to the ball nut at the attachment location, and a rotation feature attached to the threaded shaft, wherein rotating the rotation feature and the threaded shaft causes the ball nut and the attachment location to translate along the threaded shaft.

19. The medical procedure facilitation system of claim 18, wherein each variable assist mechanism further includes a variable assist distance between the attachment location of a corresponding one of the height-adjustment features and the first rotational axis, wherein translating the ball nut and the attachment location along the threaded shaft causes the variable assist distance to change.

20. The medical procedure facilitation system of claim 19, wherein each variable assist mechanism further comprises a first variable assist distance and a second variable assist distance, wherein each strut includes a strut length from the proximal end of the strut to the distal end of the strut, wherein the strut length can vary between a first strut length and a second strut length, wherein a corresponding one of the first gears receives a first moment from the strut applying the strut force to the height-adjustment feature when the strut has the first strut length and the variable assist mechanism has the first variable assist distance, wherein the first gear receives a second moment from the strut applying the strut force to the height-adjustment feature when the strut has the second strut length and the variable assist mechanism has the second variable assist distance.

21. The medical procedure facilitation system of claim 20, wherein, when the first variable assist distance is greater than the second variable assist distance, the first moment is greater than the second moment.

22. The medical procedure facilitation system of claim 18, wherein each variable assist mechanism further comprises an electric motor attached to a corresponding one of the rotation features.

23. The medical procedure facilitation system of claim 18, wherein each rotation feature is attached to the threaded shaft at the lower end of a corresponding one of the height-adjustment features.

24. The medical procedure facilitation system of claim 18, wherein each rotation feature integral with a corresponding one of the threaded shafts.

25. The medical procedure facilitation system of claim 15, wherein each lifting arm has a first pair of tubes including a first outer tube having a first diameter and a first inner tube having a second diameter smaller than the first diameter, the first inner tube having a first series of engagement holes, a second pair of tubes including a second outer tube having a third diameter and a second inner tube having a fourth diameter smaller than the third diameter, the second inner tube having a second series of engagement holes, and a spring-biased handle and a pair of locking features, wherein the spring-biased handle is attached to the pair of locking features.

26. The medical procedure facilitation system of claim 25, wherein each pair of locking features are operable between a locked position and an unlocked position, wherein each pair of locking features engage a respective one of the first series of engagement holes and a respective one of the second series of engagement holes in the locked position.

27. The medical procedure facilitation system of claim 15, wherein each lifting arm further includes a lifting arm axis that extends from the proximal end to the distal end of the lifting arm, wherein each pad sub-assembly includes a translation axis that extends along a midline of the pad sub-assembly, wherein the translation axis is orthogonal to the lifting arm axis.

28. The medical procedure facilitation system of claim 27, wherein each pad sub-assembly further includes a translation mechanism having a locking hole, wherein the translation mechanism is attached to the distal end of a corresponding one of the lifting arms, a spring-biased locking pin having a locked position and an unlocked position, wherein the spring-biased locking pin engages the locking hole in the locked position such that the pad sub-assembly is incapable of translating along the translation axis, wherein the spring-biased locking pin disengages the locking hole in the unlocked position such that the pad sub-assembly is capable of translating along the translation axis.

* * * * *